(12) United States Patent
Goldie et al.

(10) Patent No.: US 11,248,810 B2
(45) Date of Patent: Feb. 15, 2022

(54) PORTABLE APPARATUS AND METHODS USING PHASE CHANGE MATERIALS FOR CREATING A TEMPERATURE STABILIZED ENVIRONMENT

(71) Applicant: Fruition LLC, Lexington, MA (US)

(72) Inventors: James H. Goldie, Lexington, MA (US); Stephen Macomber, Stoneham, MA (US)

(73) Assignee: Fruition LLC, Lexington, MA (US)

(*) Notice: Subject to any disclaimer, the term of this patent is extended or adjusted under 35 U.S.C. 154(b) by 232 days.

(21) Appl. No.: 16/539,264

(22) Filed: Aug. 13, 2019

(65) Prior Publication Data
US 2020/0041147 A1  Feb. 6, 2020
US 2021/0180809 A9  Jun. 17, 2021

Related U.S. Application Data

(63) Continuation-in-part of application No. 15/676,535, filed on Aug. 14, 2017, now Pat. No. 10,401,074,
(Continued)

(51) Int. Cl.
*F24F 5/00* (2006.01)
*A45C 13/00* (2006.01)
(Continued)

(52) U.S. Cl.
CPC .......... *F24F 5/0021* (2013.01); *A45C 13/001* (2013.01); *A45C 13/02* (2013.01); *F25D 2400/36* (2013.01); *G10G 7/005* (2013.01)

(58) Field of Classification Search
CPC .... F24F 5/0021; A45C 13/001; A45C 13/008; A45C 13/02; F25D 2400/36; Y02E 60/14
(Continued)

(56) References Cited

U.S. PATENT DOCUMENTS 3,736,769 A  6/1973 Petersen
4,183,226 A  1/1980 Moore
(Continued)

FOREIGN PATENT DOCUMENTS

EP  2806236 A2  11/2014
GB  2467903 A * 8/2010 ............. G10G 7/005
(Continued)

OTHER PUBLICATIONS

Extended EP Search Report dated Dec. 18, 2019 of Application No. EP 17 75 7204.
(Continued)

*Primary Examiner* — Ana M Vazquez
(74) *Attorney, Agent, or Firm* — Gordon & Jacobson, P.C.

(57) ABSTRACT

A carrying case utilizes a layer of phase change materials and a thermal insulation layer in order to provide a temperature-stabilized environment for enclosed payloads such as musical instruments during transport through an environment in which temperatures differ greatly from those to which they are normally exposed. In one aspect, the phase change materials and thermal insulation provide an extended period of temperature constancy, without the addition of either active thermal control or excessively bulky insulation.

7 Claims, 16 Drawing Sheets

Related U.S. Application Data which is a continuation-in-part of application No. PCT/US2017/019112, filed on Feb. 23, 2017.

(60) Provisional application No. 62/299,828, filed on Feb. 25, 2016.

(51) Int. Cl.
*A45C 13/02* (2006.01)
*G10G 7/00* (2006.01)

(58) Field of Classification Search
USPC ...................................... 220/259.2; 62/457.1
See application file for complete search history.

(56) References Cited

U.S. PATENT DOCUMENTS

| | | | |
|---|---|---|---|
| 5,237,838 A * | 8/1993 | Merritt-Munson .. | A45C 11/008 383/110 |
| 6,070,414 A | 6/2000 | Ross et al. | |
| 6,412,545 B1 | 7/2002 | Buff et al. | |
| 6,422,032 B1 | 7/2002 | Greene | |
| 6,474,095 B1 | 11/2002 | Chan | |
| 6,931,875 B1 | 8/2005 | Allen et al. | |
| 7,336,252 B2 * | 2/2008 | Tsuyuki ............... | G09G 3/3666 345/209 |
| 8,209,995 B2 | 7/2012 | Kielling et al. | |
| 9,435,578 B2 * | 9/2016 | Calderon .............. | F25D 11/006 |
| 10,401,074 B2 | 9/2019 | Goldie et al. | |
| 2003/0124318 A1 | 7/2003 | Magill et al. | |
| 2003/0128898 A1 | 7/2003 | Malone et al. | |
| 2004/0186541 A1 | 9/2004 | Agarwal et al. | |
| 2007/0032774 A1 | 2/2007 | Glade et al. | |
| 2008/0164265 A1 | 7/2008 | Conforti | |
| 2009/0294455 A1 * | 12/2009 | Pruchnicki ......... | B65D 81/3816 220/592.2 |
| 2010/0264048 A1 | 10/2010 | Gunsberg | |
| 2012/0023664 A1 * | 2/2012 | Joo ...................... | A47C 21/042 5/421 |
| 2012/0330388 A1 | 12/2012 | Chen et al. | |
| 2014/0182753 A1 | 7/2014 | Secretan | |
| 2014/0248003 A1 * | 9/2014 | Mogil .................. | B65D 81/389 383/3 |
| 2015/0151893 A1 | 6/2015 | Wengreet et al. | |
| 2015/0204601 A1 | 7/2015 | Baker et al. | |
| 2015/0232266 A1 | 8/2015 | Ahmed et al. | |
| 2015/0239640 A1 | 8/2015 | Smith et al. | |
| 2015/0274415 A1 | 10/2015 | Farrar et al. | |
| 2015/0274928 A1 | 10/2015 | Mehta et al. | |
| 2015/0283504 A1 | 10/2015 | Rhodes et al. | |
| 2015/0285565 A1 | 10/2015 | Cnossen et al. | |
| 2015/0367604 A1 | 12/2015 | Anderson et al. | |
| 2016/0075498 A1 | 3/2016 | Mayer et al. | |
| 2016/0161171 A1 | 6/2016 | Blezard et al. | |
| 2016/0215194 A1 | 7/2016 | Narine et al. | |
| 2016/0227947 A1 | 8/2016 | Crouch | |
| 2016/0347532 A1 | 12/2016 | McCormick | |
| 2016/0362240 A1 | 12/2016 | Ferracamo, Jr. | |
| 2017/0115046 A1 | 4/2017 | Blezard et al. | |
| 2018/0031295 A1 | 2/2018 | Goldie | |

FOREIGN PATENT DOCUMENTS

| | | |
|---|---|---|
| GB | 2475478 A | 5/2011 |
| IT | 020 090 366 A1 | 11/2010 |
| IT | MI20 091 398 A1 | 2/2011 |
| WO | WO2014/067927 A1 | 5/2014 |

OTHER PUBLICATIONS

Extended EP Search Report dated Dec. 8, 2020 of Application No. EP20190194.

"High-Tech Outdoors", Popular Mechanics, Mar. 1990, vol. 167, No. 3, ISSN-0032-4558, 132 pages; p. 92 Retrieved on Apr. 13, 2017 from http://www.worldcat.org/title/popular-mechanics-magazine/oclc/1638998.

"How to Wax Your Own Clothing and Gear", Anderberg, The Art of Manliness, Jun. 3, 2014, Retrieved on Apr. 13, 2017 from http://www.artofmanliness.com/2014/06/03/how-to-wax-your-own-clothing-and-gear/.

"Low Emissivity" Wikipedia, Dec. 27, 2015, p. 2-3; Retrieved on Apr. 13, 2017 from https://en.wikipedia.org/wiki/Low_emissivity.

"Styrofoam", Wikipedia, Dec. 20, 2015; p. 1-3; Retrieved on Apr. 13, 2017 from https://en.wikipedia.org/wiki/Styrofoam.

Search Report and Written Opinion dated May 15, 2017 of International Application No. PCT/US 17/19112.

* cited by examiner

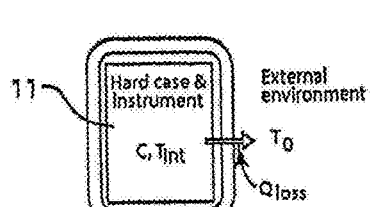
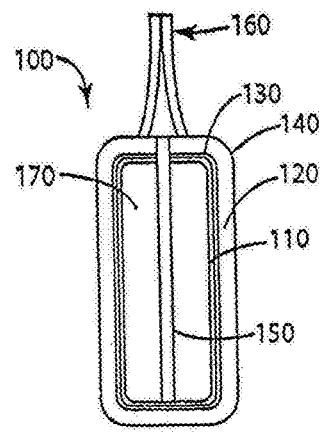
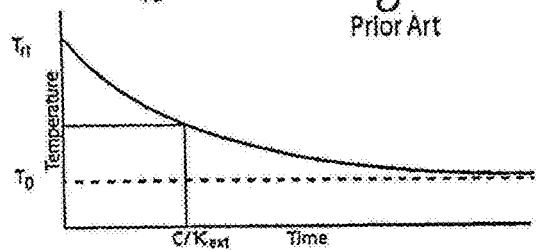
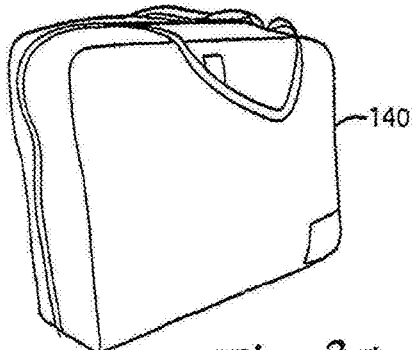
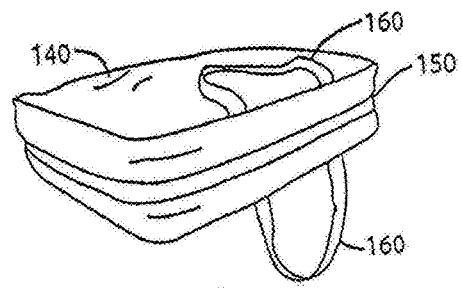
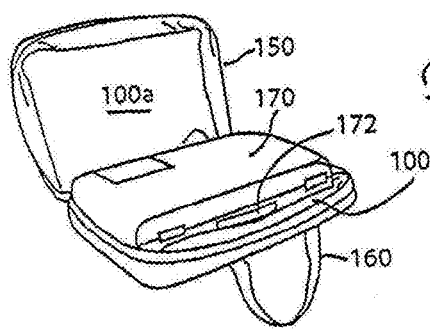
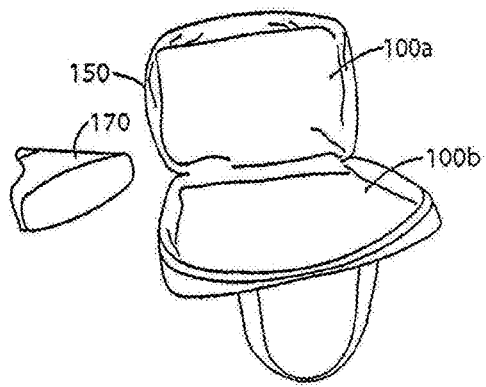

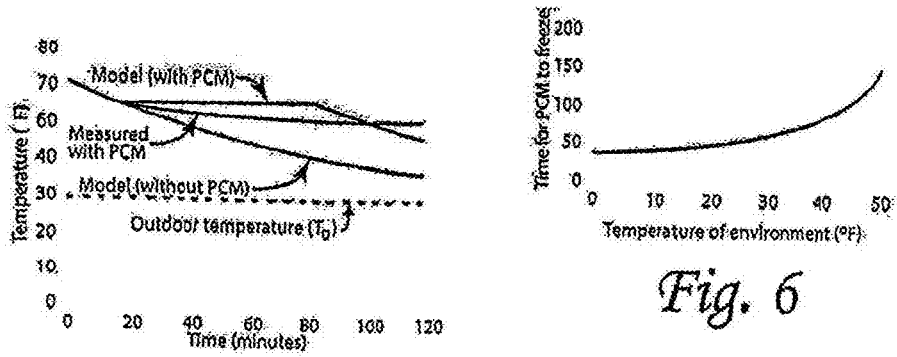
Fig. 5
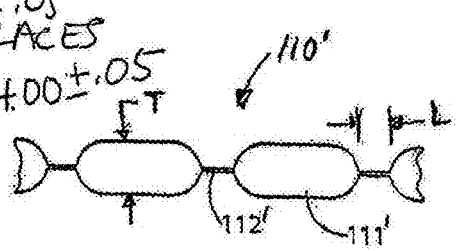
Fig. 6
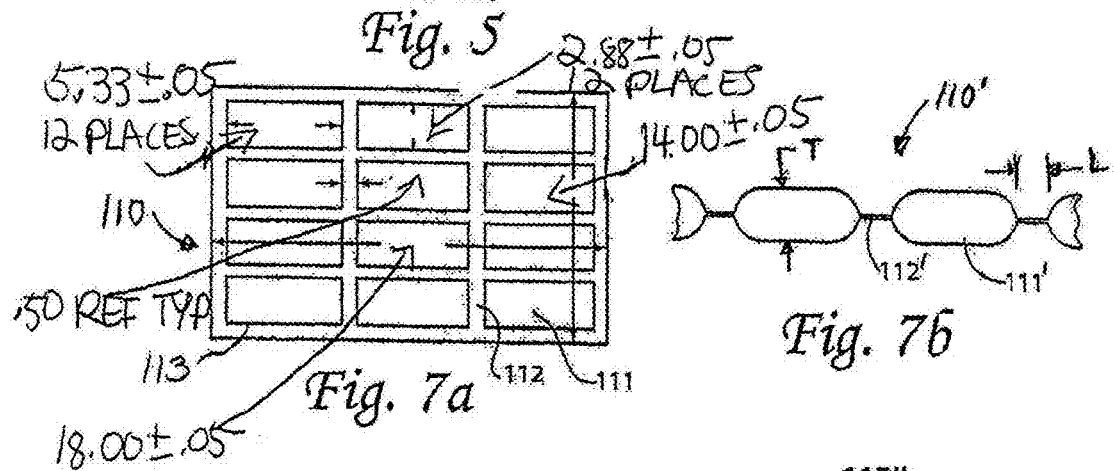
Fig. 7a
Fig. 7b
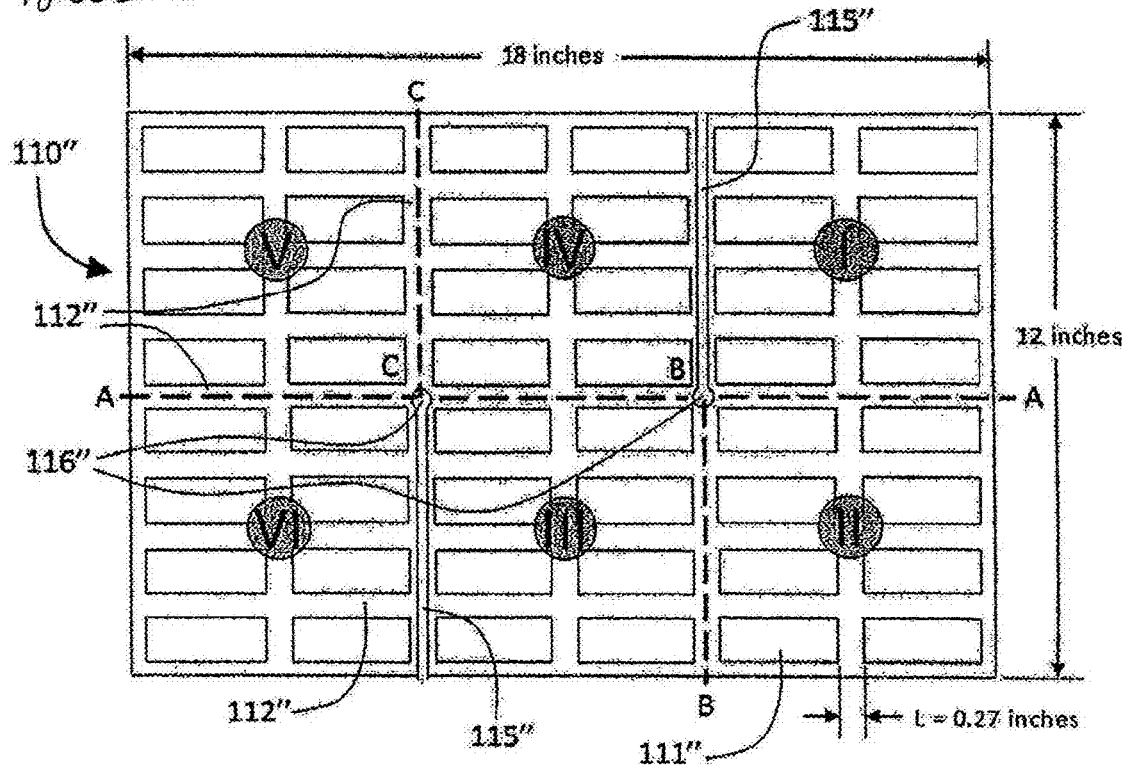
Fig. 7c

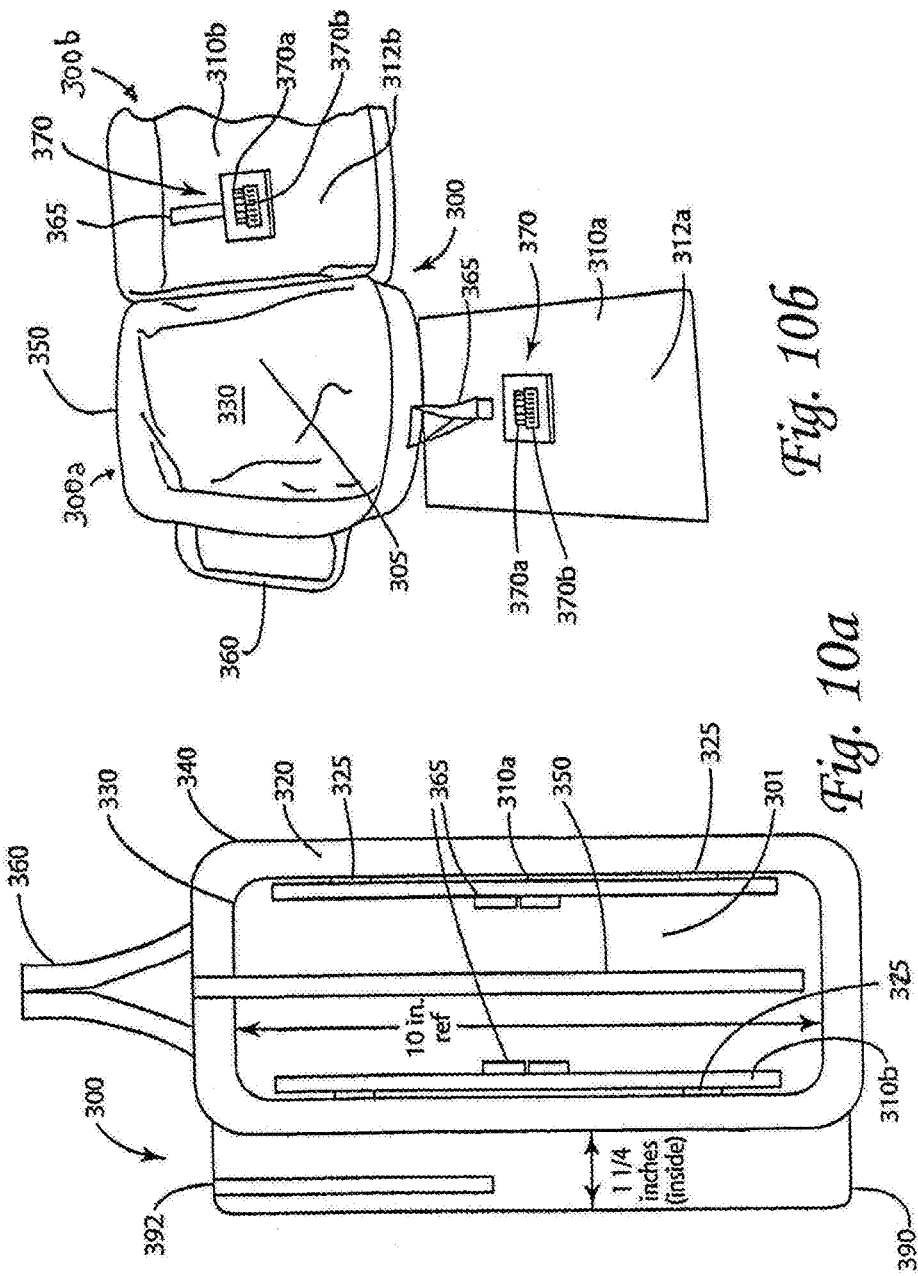

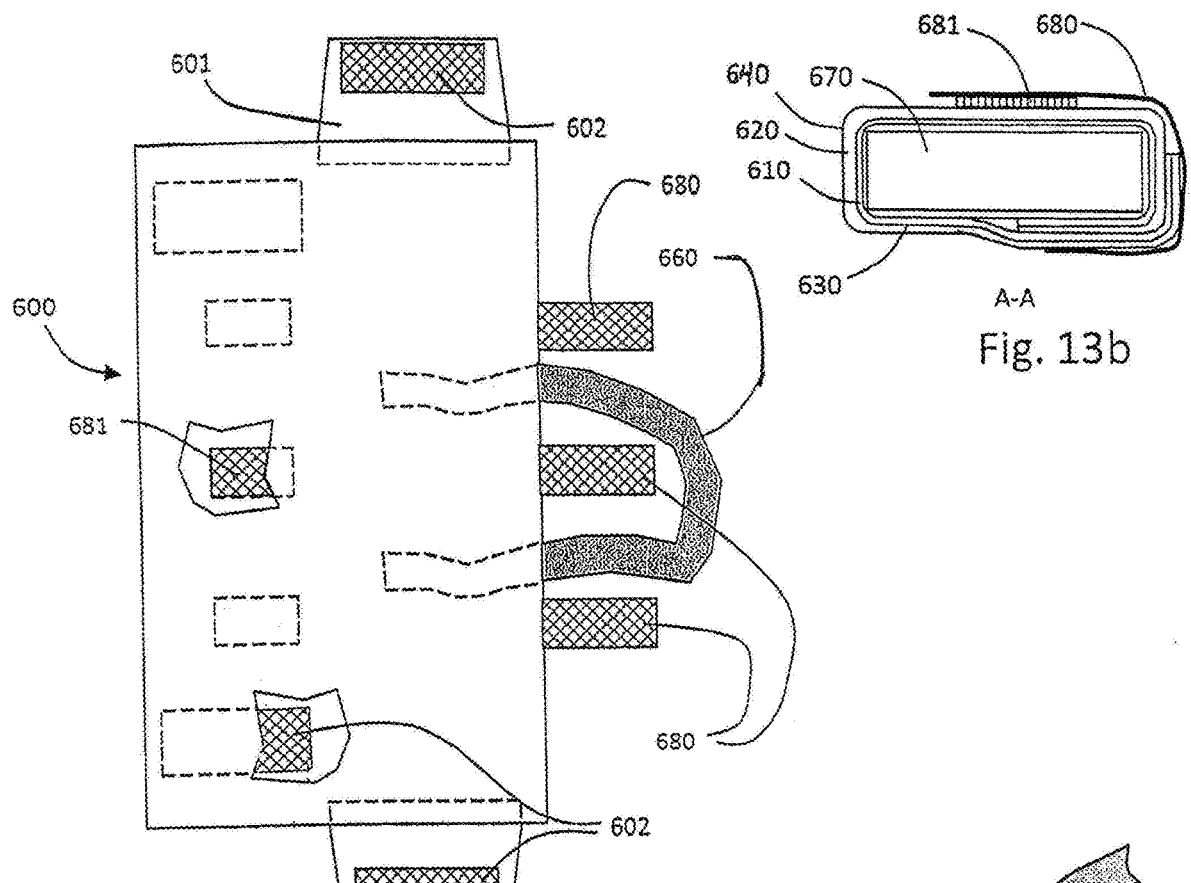
Fig. 13b
Fig. 13
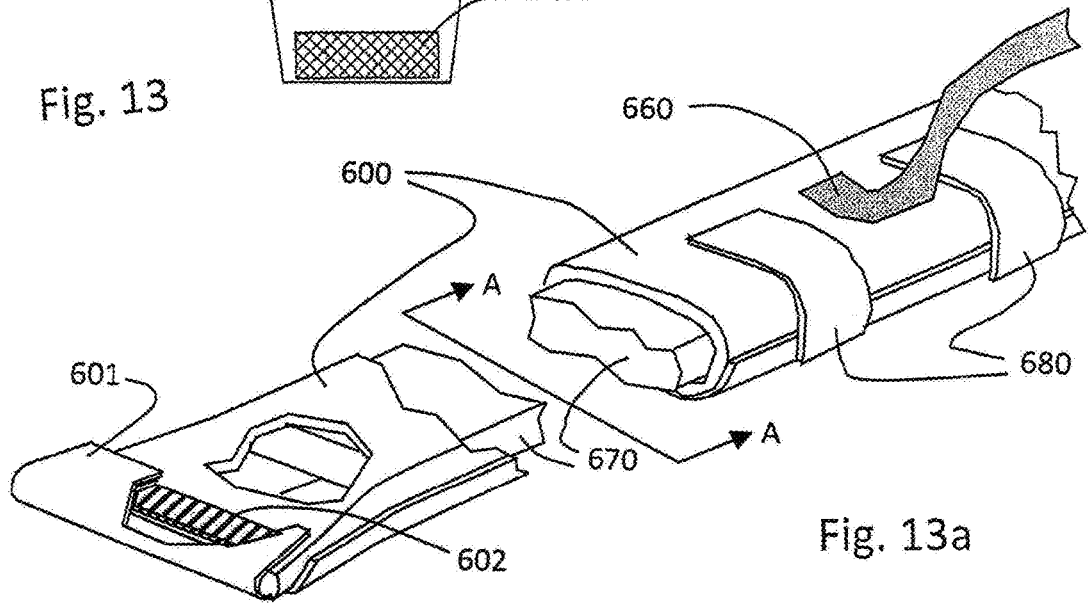
Fig. 13a

PORTABLE APPARATUS AND METHODS USING PHASE CHANGE MATERIALS FOR CREATING A TEMPERATURE STABILIZED ENVIRONMENT

RELATED CASES

This application is a continuation-in-part of U.S. Ser. No. 15/676,535 filed on Aug. 14, 2017, which is a continuation-in-part of PCT/US2017/019112 filed Feb. 23, 2017, which in turn claims priority from U.S. provisional patent application 62/299,828 filed Feb. 25, 2016.

BACKGROUND

1. Field

The present disclosure relates to portable apparatus having a temperature stabilized environment. More particularly, the present disclosure relates to carrying bags and containers for delicate and/or expensive devices which are ideally contained in a temperature stabilized environment to protect them from quick transitions from warm to cold environments or vice versa. The present disclosure has particular application to carrying bags and containers for musical instruments although it is not limited thereto.

The present disclosure relates to portable apparatus having a temperature stabilized environment. More particularly, the present disclosure relates to carrying bags and containers for delicate and/or expensive devices which are ideally contained in a temperature stabilized environment to protect them from quick transitions from warm to cold environments or vice versa. The present disclosure has particular application to carrying bags and containers for musical instruments although it is not limited thereto.

2. State of the Art

The transport of temperature-sensitive equipment, instruments, devices or objects through extreme weather conditions can result in costly damage to these items. In particular, oboes, clarinets, bassoons, cellos, violins, guitars, recorders, piccolos and other musical instruments made from wood have been observed to crack during or after exposure to cold temperatures. A common occurrence, for example, is for the top joint of an oboe to crack while being played, after it has been carried outdoors in its case on a cold winter day or evening. Cracking is an abrupt event that can render a wooden instrument unplayable during a performance or rehearsal. Further, a time-consuming and costly repair is required, and in some instances the instrument or the affected portion of the instrument is unsalvageable. Further, even non-wooden instruments such as saxophones, flutes, and plastic clarinets possess pads and other components that may be degraded by extreme temperatures or variations in temperature such as those that may occur in a parked car in the summer or on a cold winter day.

It is believed that humidity as well as temperature plays a role in the phenomenon of cracking of the wood, but humidity and temperature are coupled, and, therefore, control of the temperature in the space in which an instrument is kept is primary and resistance to loss of water vapor from this space is secondary. Typically, musical instruments are placed in a hard case, which is then placed in a snugly fitting fabric case cover for transport (see FIG. 1). A damp sponge or a humidity control package such as sold by Boveda of Minnetonka, Minn. may be placed in the hard case alongside the instrument to maintain some level of humidity within the hard case. Case covers provide a measure of thermal protection, as well as protection against shock and handling. However, wooden instruments continue to crack even when carried in these prior art cases and case covers after having been subjected to large temperature differentials.

SUMMARY

A carrying case utilizes a layer of phase change materials and a thermal insulation layer in order to provide a temperature-stabilized environment for enclosed payloads during transport through an environment in which temperatures differ greatly from those to which they are normally exposed. In one aspect, the phase change materials and thermal insulation provide an extended period of temperature constancy, without the addition of either active thermal control (i.e., batteries and heaters) or excessively bulky insulation. The result can be a compact, reliable carrying case that benefits a wide range of equipment, devices, and objects that are temperature sensitive or at risk of being damaged from exposure to abnormal temperatures.

In one embodiment, a carrying case comprises a "soft" outer carrying bag that fits around a hard inner case that is used for an object or device such as a musical instrument. The soft outer carrying bag includes a plurality of layers, including 1) an inner layer having a phase change material (PCM) contained in an optionally segmented flexible sheet comprising multiple pockets or cells, and 2) an outer insulation layer that may also serve as a shock absorber. The PCM is designed to change phase at a temperature of between 50° F. and 75° F., and preferably between 55° F. and 73° F., and more preferably at a temperature of between 60° F. and 66° F. In one embodiment, a low emissivity layer is located between the phase change material layer and the outer insulation layer. In one embodiment, a wear-resistant and/or water-resistant fabric layer is provided over (outside) the outer insulation layer or may constitute the outer insulation layer itself. In one embodiment, the fabric layer is impermeable to water vapor.

In one embodiment the carrying case is designed as a pouch with three closed edges and a closable flap adjacent an opening into the pouch.

In one embodiment the carrying case is designed as a pouch with a periphery comprising a continuous edge consisting of one or more curved or straight closed edges that meet at their ends and an open edge with a zipper or other means of closure that serves as an opening into the pouch.

In one embodiment the carrying case is designed as a wrap with closure elements so that the wrap can completely envelope a musical instrument case or the like.

In one embodiment, the carrying case is provided with liquid crystal temperature indicators (LCTIs) that are coupled to the PCM layer. The LCTIs provide a visual indication of the temperature of the PCM layer.

A method of transporting a temperature-sensitive instrument, equipment, device or object (hereinafter broadly referred to as "object") includes placing the object in a relatively hard instrument case, and placing the hard instrument case in a relatively soft, temperature-stabilized, outer carrying case. The soft outer carrying case includes a plurality of layers, including an inner layer having a phase change material (PCM) contained in a segmented flexible sheet and an outer insulation layer that may also serve as a shock absorber. The PCM is designed to change phase at a temperature of between 50° F. and 75° F., and preferably between 55° F. and 73° F., and more preferably at a temperature of between 60° F. and 66° F. In one embodiment, a low emissivity layer is located between the phase change material layer and the outer insulation layer. In one embodiment, a wear-resistant and/or water-resistant fabric layer is provided over (outside) the outer insulation layer or may constitute the outer insulation layer itself. The fabric layer may be impermeable to water vapor.

Additional aspects, embodiments, objects and advantages of the disclosed methods may be understood with reference to the following detailed description taken in conjunction with the provided drawings.

BRIEF DESCRIPTION OF THE DRAWINGS

FIG. 1 is a prior art schematic showing a hard instrument case contained in a case cover.

FIG. 2 is a temperature time plot for the interior of the case cover of FIG. 1.

FIGS. 3a-3d are diagrams of a carrying case utilizing a layer of phase change materials and a thermal insulation layer, with FIGS. 3a and 3b showing the bag closed, FIG. 3c showing the bag opened with a hard instrument case contained therein and FIG. 3d showing the hard instrument case removed from the carrying case.

FIG. 4 is a transparent view diagram of the carrying case of FIGS. 3a-3d.

FIG. 5 is a temperature versus time plot for the interior of the carrying case of FIG. 4 as modeled and as measured.

FIG. 6 is a plot showing the time over which phase change material freezes as a function of the outdoor temperature.

FIGS. 7a and 7b are respectively a top view schematic of a segmented flexible phase change material layer and a side view schematic of an alternative segmented flexible phase change material layer.

FIGS. 7c and 7d are respective a top view schematic of a foldable, stackable segmented flexible PCM layer, and a perspective view of the foldable segmented flexible PCM layer which is folded into a stack.

FIGS. 10a and 10b are respectively a transparent view diagram, and an open-bag perspective view with one detachable PCM thermal insert in place and one removed of another embodiment.

FIG. 13 is a plan view of an unfolded wrap case embodiment.

FIGS. 13a and 13b are respectively a broken perspective view of the wrap case of FIG. 13 wrapped around a musical instrument case and a cross-sectional view of the wrap case of FIG. 13 wrapped around a musical instrument case.

DETAILED DESCRIPTION

Figure 3E:
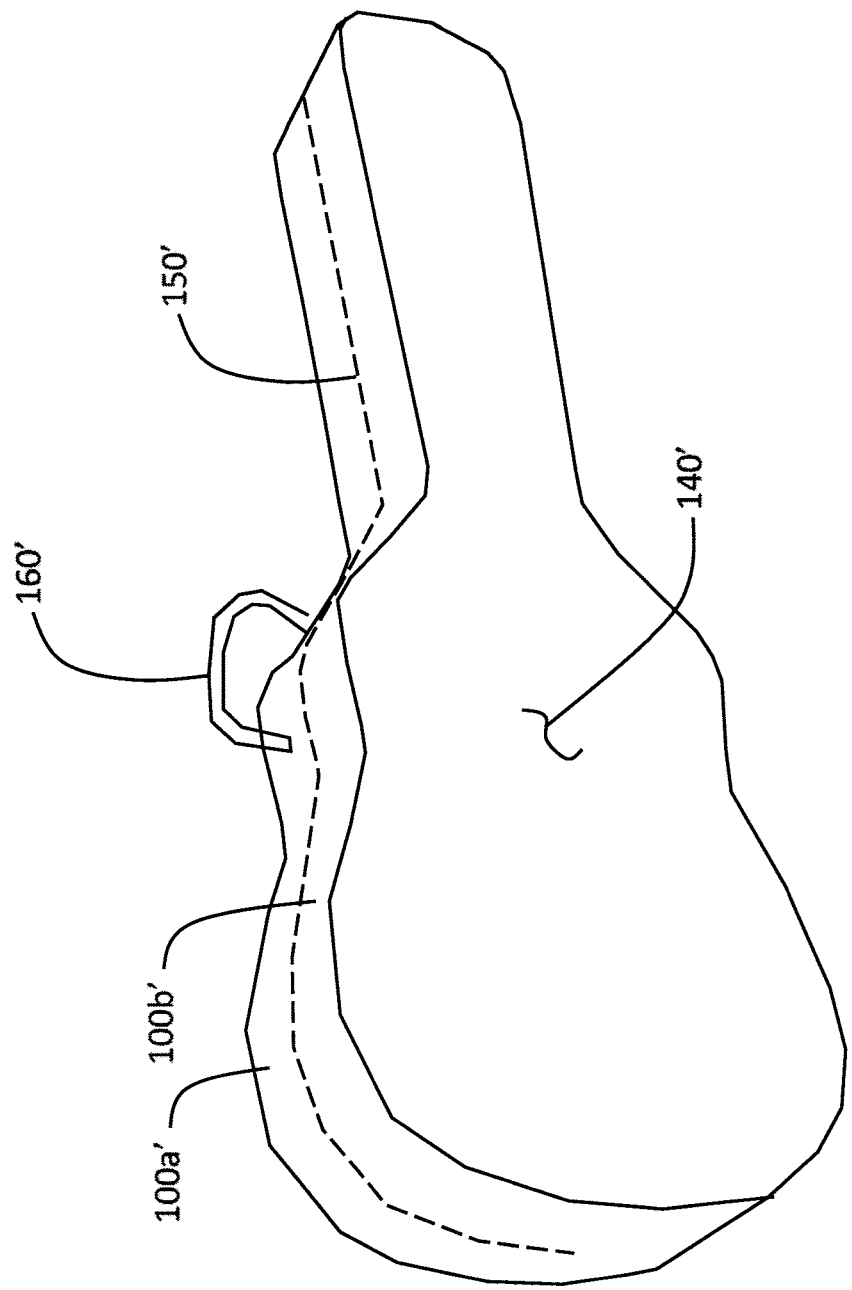
FIG. 3e is a diagram showing a carrying case which is non-rectangular in shape.

Turning to FIG. 1, a prior art schematic shows a hard case 11 contained in a case cover 13. The hard case may carry an object such as a musical instrument. The hard case and the musical instrument contained within, in combination, are assumed to possess a heat capacity C and to be isothermal at temperature $T_{int}$, while the external environment is shown with a temperature $T_0$. It is noted that the temperature at the interior of the case cover 13 is assumed to be equivalent to the hard case 11. Heat loss from the hard case 11 through the case cover 13 to the external environment is shown as $Q_{loss}$.

As heat is lost to the outdoor environment through the thermal insulation of the case cover 13, the hard case and the instrument contained within it gradually cool. The rate at which the temperature at the interior of the case cover drops ($dT_{int}/dt$) is related to both the rate of heat loss ($Q_{loss}$) through the case cover and the heat capacity (C) of the hard case (including the instrument within it) according to $$\frac{dT_{int}}{dt} = -\frac{Q_{loss}}{C}. \tag{1}$$

The rate of heat loss ($Q_{loss}$) is related to the difference in the temperature at the interior of the case cover ($T_{int}$) and the temperature of the surrounding external environment ($T_0$):

$$Q_{loss} = \kappa_{ext}(T_{int} - T_0),$$

where $\kappa_{ext}$ is the thermal conductance from the interior of the case cover to the external environment. Substituting Eqn. (2) into Eqn. (1) yields $$\frac{dT_{int}}{dt} = -\frac{\kappa_{ext}(T_{int} - T_0)}{C}. \tag{3}$$

The solution of this differential equation is $$T_{int}(t) = T_0 + (T_{int}|_{t=0} - T_0)\exp\left(-\frac{\kappa_{ext}t}{C}\right), \tag{4}$$

where $T_{int}|_{t=0}$ is the temperature at the interior of the case cover when it is first brought out into the cold. This is an exponential decay in the temperature difference between the interior of the case cover and the surrounding outdoor temperature. In one instance, $T_{int}$ is considered to be at room temperature ($T_{rt}$) when the case cover is first exposed to the cold, and, therefore:

$$T_{int}(t) = T_0 + (T_{rt} - T_0)\exp\left(-\frac{\kappa_{ext}t}{C}\right). \quad (5)$$

This result is graphed conceptually in FIG. 2, where it is seen that the temperature at the interior of the case cover (and of the hard case) exponentially approaches the temperature of the surrounding environment ($T_0$). The temperature difference decays to 37% of its initial value after one time constant ($t=C/\kappa_{ext}$). After two time constants, the temperature difference is only 14% of its initial value. It is noted that in FIGS. 1 and 2, the model looks at the temperature of the interior of the case cover, which is assumed to be equal to the hard instrument case contained inside the case cover. The instrument case and instrument are treated as isothermal, since the temperature difference between the exterior of the instrument case and the instrument it holds will be small compared to the temperature difference between the instrument case and the external environment on a cold day or evening.

Turning to FIGS. 3a-3d and 4, a carrying case 100 is shown that employs the ability of materials to naturally store and release heat. In particular, and as seen best in FIG. 4, the carrying case 100 utilizes an inner layer 110 of phase change material (PCM) that absorbs and releases a significant amount of energy (known as the "latent heat of fusion") as the PCM transitions from one state to another (e.g., from a liquid state to a solid state—also called "freezing") and an outer insulation layer 120 which may be made from a fiber insulation such as THINSULATE (a trademark of 3M Corporation). If desired, a low emissivity sheet of material 130 (seen in FIG. 4) such as the low emissivity foil TEMPTROL (a trademark of Temptrol Corp. of New Jersey) may be located between the PCM layer 110 and the insulation layer 120. Also, if desired, a wear-resistant, water-resistant fabric layer 140, such as CORDURA (a trademark of Invista of Kansas) or Sur Last® (by Glen Raven of North Carolina) may be provided over (outside) the outer insulation layer 120. The fabric layer 140 may also be impermeable to water vapor. Alternatively, a separate water vapor-impermeable layer (not shown) may be provided. The carrying case 100 may be provided with a zipper or other closure means 150, and a handle 160 or shoulder strap (not shown) or both. The handle 160 may be a split handle with one loop attached to each portion of the carrying case 100a, 100b and may be made from webbing. The carrying case 100 is dimensioned to fit over a relatively hard case 170 as seen in FIG. 3c and optionally may provide spare space for commonly used instrument accessories. By way of example only, the hard case 170 may be a musical instrument case that includes a handle 172.

As seen in FIG. 3e, a similar carrying case 100' to that shown in FIGS. 3a-3d and 4 is provided, except that the carrying case 100' is not a rectangular cuboid (i.e., a 6-sided rectilinear shape). Instead, carrying case 100' is shaped, e.g., to receive a guitar or cello (not shown) in either their hard cases or directly. Carrying case 100' has front and rear portions 100a', 100b', outer wear-resistant, water-resistant, a layer of PCM material (not shown), an optional low emissivity sheet (not shown), fabric layer 140', a zipper or other closure means 150' and a handle 160'.

In one embodiment, the phase change material (PCM) is a material formed from salt hydrates, paraffins, or fatty acids which is contained in a segmented flexible laminate sheet as discussed hereinafter. In another embodiment, the PCM material is a segmented package sold under the name MATVESL PURETEMP by Entropy Solutions of Plymouth, Minn. As described earlier, during exposure to cold temperatures, heat is gradually lost to the environment through the carrying case insulation, and the interior of the carrying case cools. However, with the layer of PCM 110 present, once the interior of the carrying case cools to the temperature at which the PCM changes state ("freezes"), the PCM, initially in its liquid state, begins the phase change process. Frozen pieces of PCM gradually form and grow in number and extent, surrounded by PCM in its liquid state which remains at or slightly above the freezing temperature. Therefore, although there will be slight variations in temperature throughout the volume of PCM, the temperature of the two-phase solution of PCM comprised of solid and liquid PCM remains virtually constant at or very near the phase change temperature $T_{pc}$, until the entire quantity of PCM is frozen. The time necessary to complete the phase change is large, due to 1) the large latent heat of fusion (i.e., energy released from phase change) of the PCM and 2) the high resistance (° C./W) to heat loss to the environment through the low emissivity layer 130, the insulation layer 120, and convection at the outer surface of the carrying case cover 100. Over the duration of this phase change process, the temperature descent of the musical instrument and hard case 11, which is in close thermal contact with the PCM layer 110, is arrested at or near the temperature $T_{pc}$.

In one embodiment, the PCM material is provided with a phase transition temperature selected to be between 50° F. and 75° F. In another embodiment, the PCM material is provided with a phase transition temperature selected to be between 55° F. and 73° F.; and in another embodiment to be between 60° F. and 66° F.; e.g., 64° F.

Since the temperature within the interior of the carrying case remains constant at the phase change temperature ($T_{pc}$) while the PCM undergoes freezing, the length of time that the temperature at the interior of case cover holds constant at $T_{pc}$ is equivalent to the time it takes for the PCM to freeze, which can be estimated by:

$$t_{freeze} = \frac{h_{fusion}m_{pcm}}{\kappa_{ext}(T_{pc} - T_0)}, \quad (6)$$

where $h_{fusion}$ is the specific heat of fusion of the PCM, $m_{pcm}$ is the mass of the PCM, and $T_{pc}$ is the phase change temperature of the PCM. The basis for this expression is clear; the numerator is the heat (e.g., in Joules) released by the PCM to complete its phase change, and the denominator is the rate at which this heat escapes from the case cover to the surrounding air (J/s).

For purposes of illustration only, a prototype carrying case suitable for enclosing a double clarinet case has been constructed as seen in FIGS. 3a-3d and FIG. 4. The approximate exterior dimensions of case 100 is seventeen inches width by thirteen inches height by 5.25 inches depth, which represents a total outer surface area of A=0.49 m² (with suitable unit conversions). A commercially available synthetic fiber material (THINSULATE—a trademark of the 3M Company of Maplewood, Minn.) was used for thermal insulation layer 120 with a thickness of $l_{insul}$=0.8 inches (0.020 m) and an effective thermal conductivity of approximately k=0.044 W/m-K. The thermal conductance of the insulation of the case cover ($\kappa_{insul}$) can then be estimated by $$\kappa_{insul} = \frac{kA}{l_{insul}} = \frac{0.044 \text{ W/}mK \times 0.49 \text{ m}^2}{0.20 \text{ m}} = 1.1 \text{ W/}K. \quad (7)$$

The effective conductance of the convective heat transfer ($\kappa_{conv}$) from the outer surface of the case cover to the surrounding air is estimated by $$\kappa_{conv} = hA = 5 \text{ W/m}^2 \text{ K} \times 0.49 \text{ m}^2 = 2.5 \text{ W/k}, \quad (8)$$

where a value of 5 W/m² K has been used for the convective heat transfer coefficient (as published by Engineers Edge LLC for a thirty degree C. temperature difference). See, http://www.engineersedge.com/heat_transfer/convective_heat_transfer_coefficients_13378.htm. The net thermal conductance to the external environment ($\kappa_{ext}$) of equations (2) to (6) is then computed by $$\kappa_{ext} = \frac{1}{\frac{1}{\kappa_{insul}} + \frac{1}{\kappa_{conv}}} = \frac{1}{\frac{1}{1.1 \text{ W/}K} + \frac{1}{2.5 \text{ W/}K}} = 0.76 \text{ W/}K. \quad (9)$$

The PCM used was 390 g of commercially-available encapsulated paraffin with a specific heat of fusion of $h_{fusion}$=150 J/g and $T_{pc}$=64° F. (=18° C.). Equation (6) can be used to estimate the time over which freezing of the PCM occurs during exposure of the case cover to 30° F. (=−1.1° C.):

$$t_{freeze} = \frac{h_{fusion} m_{pcm}}{\kappa_{ext}(T_{pc} - T_0)} = \quad (10)$$

$$\frac{150 \text{ J/g} \times 390 \text{ g}}{0.76 \text{ K/W} \times (18° \text{ C.} - -1.1° \text{ C.})} = 4030 \text{ s} = 67 \text{ min.}$$

FIG. 5 shows the temperature at the inside of the carrying case versus time, as predicted by the thermal model of equation (5), assuming the values shown in Table 1 below, both without and with PCM present with $T_{pc}$=64° F. (18° C.). The addition of the PCM is modeled as simply a 67-minute delay in temperature descent, beginning at the instant that the temperature reaches the phase change temperature (64° F.). Also shown on the graph for the purpose of comparison are measured temperatures versus time at the interior of the case cover (with PCM present). The measured temperatures show a stabilized temperature well above the temperature predicted by the model for a carrying case without PCM present.

TABLE 1

| Values used in thermal model for predicted temperature vs. time curves of FIG. 5 | |
| --- | --- |
| $T_0$ | 30° F. (−1.1° C.) |
| $T_{rt}$ | 70° F. (21° C.) |
| $T_{pc}$ | 64° F. (18° C.) |
| $h_{fusion}$ | 150 J/g (encapsulated paraffin) |
| $m_{pcm}$ | 390 g |
| $\kappa_{ext}$ | 0.76 K/W (see Eqn. (9) |

TABLE 1-continued

| Values used in thermal model for predicted temperature vs. time curves of FIG. 5 | |
| --- | --- |
| C | 4500 J/K (based on a specific heat of 2 J/g-K and a total mass of 5.0 lbm |

The carrying case may, of course, be exposed to colder temperature than $T_0$=30° F. during winter transport. FIG. 6 shows the time of freezing for other assumed values of $T_0$ in equation (10). As expected, the time of freezing of the PCM decreases (and, hence, so does the duration of thermal protection) as the outdoor temperature decreases. For example, the freezing time as modeled dropped to only thirty-six minutes when the carrying case is exposed to an external temperature of 0° F. The curve shown assumes the values given in Table 1 for $T_{pc}$, $h_{fusion}$, $m_{pcm}$, and $\kappa_{ext}$. If, for example, the mass of PCM were doubled to 780 g, then the freezing time would double as well (see equation (6)).

In addition to delaying the temperature descent of the hard case contained within the carrying case, the carrying case may delay changes in humidity, both relative and absolute, at the interior of the carrying case and, hence, the hard case and musical instrument. Relative humidity, the primary determinant of moisture absorption by wood, is a function of air temperature, and therefore, by virtue of delaying temperature change at its interior, the carrying case will delay change in relative humidity at its interior. Change in absolute humidity, also a determinant of relative humidity, is delayed by impeding the passage of water vapor molecules from the interior of the carrying case to the exterior environment. Accordingly, fabrics that are water resistant or even impermeable to water in both its liquid and vapor phases, as well as employment of closure methods that seal against moisture transport, may be used. Optionally, a humidity control packet or element which keeps the relative humidity constant by dispensing or absorbing water vapor as needed (such as sold by Boveda of Minnetonka, Minn.) may be placed within the carrying case.

In one aspect, the phase change temperature of the PCM is selected to be below room temperature (i.e., $T_{pc} < T_{rt}$) or else the PCM will not return to its liquid phase when it is brought indoors and will not provide the desired temperature stabilization due to phase change during subsequent exposure to the outdoors. In the above calculations, the PCM used was assumed to have a phase change temperature ($T_{pc}$) of 64° F. (=18° C.). This value is reasonable, since it maintains the interior of the case cover at a temperature safe for the enclosed case and instrument. However, $T_{pc}$ also determines the time needed for the PCM, which has fully or partially frozen during outdoor transport, to fully re-melt when the case cover comes indoors. In one embodiment the phase change temperature ($T_{pc}$) is chosen to be far enough below room temperature that the PCM can regain its liquid state (i.e., melt) in the time available between trips outdoors.

The time needed to melt the PCM indoors can be estimated from $$t_{melt} = \frac{h_{fusion} m_{pcm}}{\kappa_{int}(T_{rt} - T_{pc})}, \quad (11)$$

where equation (11) is identical with equation (6), except that $T_{rt} - T_{pc}$ has been substituted for $T_{pc} - T_0$ and $\kappa_{int}$ for $\kappa_{ext}$, where $\kappa_{int}$ is the thermal conductance from the PCM to the room temperature air, when the case cover is indoors.

In one aspect, it is enlightening to divide equation (11) by equation (6):

$$\frac{t_{melt}}{t_{freeze}} = \frac{\kappa_{ext}}{\kappa_{int}} \times \left(\frac{T_{pc} - T_0}{T_{rt} - T_{pc}}\right). \quad (12)$$

The temperature-related factor on the right-hand side of equation (12) is larger than unity. For example, with the values assumed above of $T_{pc}=18°$ C., $T_0=-1.1°$ C., and $T_{rt}=21°$ C., this factor is 6.4. Assuming $\kappa_{ext}=\kappa_{int}$, this would mean that the melting of the PCM would take 6.4 times longer than the freezing did. In one aspect, it may be acceptable for the melting to take longer than the freezing, since the carrying case (and enclosed instrument and case) are typically inside rather than being transported outdoors. However, it one embodiment, it is desirable that $t_{melt}/t_{freeze}$ be small rather than large. More particularly, the condition that ensures that the PCM will continue to provide thermal protection is $$\frac{t_{inside}}{t_{outside}} \geq \frac{t_{melt}}{t_{freeze}} = \frac{\kappa_{ext}}{\kappa_{int}} \times \left(\frac{T_{pc} - T_0}{T_{rt} - T_{pc}}\right), \quad (13)$$

where $t_{inside}$ and $t_{outside}$ are the times spent inside and outside, respectively, over any arbitrarily chosen interval of time of duration $t_{melt}+t_{freeze}$.

Equation (11) indicates that it could be desirable that the carrying case be designed to maximize $\kappa_{int}$, since this will shorten the time necessary for the PCM to melt during indoor exposure. Therefore, in one embodiment, the carrying case is designed such that, when zipped open, the interior of the carrying case is fully exposed to the room temperature air (once the instrument case is removed), as shown in FIG. 3*d*. With the carrying case left open, there is no insulation between the PCM 110 and the warm air in the room, and $\kappa_{int}$ is considerably greater than $\kappa_{ext}$. Equation (9), the expression for $\kappa_{ext}$, can be used to estimate $\kappa_{int}$ simply by setting $\kappa_{insul}=\infty$ (since no insulation is present on the interior of the carrying case) so that:

$$\kappa_{int}=\kappa_{conv}=2.6 \text{ W/K} \quad (14)$$

Plugging in the above numbers into equation (13) yields the following:

$$\frac{t_{inside}}{t_{outside}} \geq \frac{0.76}{2.6} \times \left(\frac{18° \text{ C.} - ^-1.1° \text{ C.}}{21° \text{ C.} - 18° \text{ C.}}\right) = 1.9, \quad (15)$$

or, alternatively:

$$\frac{t_{inside}}{t_{outside} + t_{inside}} \geq \frac{1.9}{1+1.9} = 0.66. \quad (16)$$

For the specific example using the above numbers, equation (16) implies that in order to have uninterrupted temperature protection from the PCM for a carrying case assumed to be exposed to $-1.1°$ C. (30° F.) while outdoors and 21° C. (70° F.) while indoors, the carrying case should be kept indoors for at least 66% of the time over any 194-minute period of time ($=t_{melt}+t_{freeze}=1.9\times67$ min.+67 min.). This result depends, of course, on the values of $T_{pc}$, $T_{rt}$, $T_0$, $\kappa_{int}$, and $\kappa_{ext}$, so this value applies to only this set of values for these parameters. Further, although this specific example considers only two temperatures, it will be appreciated that the carrying case may be exposed to greater than two temperatures over the course of its daily use.

In one aspect, it will be appreciated that of all the parameters impacting the temperature stability provided by the case cover, $T_{pc}$ and $\kappa_{ext}$ are perhaps the most easily changed. In particular, $T_{pc}$ may be changed by selecting the desired PCM, while $\kappa_{ext}$ may be changed by adjusting the amount of insulation present. Per equation (13), decreasing $T_{pc}$ reduces the fraction of time that the carrying case must be kept inside. Increasing the amount of fiber insulation decreases $\kappa_{ext}$ (see equations (7) and (9)), which also decreases the fraction of time that the carrying case must be kept inside (see equation (13)).

The carrying case still provides some measure of thermal protection even if the PCM is entirely frozen, since the thermal insulation continues to operate independently of the PCM.

As seen in FIGS. 3*c* and 3*d*, in one embodiment, the carrying case 100 can open like a book when unzipped, in order that the PCM at the interior of the carrying case is fully exposed to the warmth of the room in the manner described above.

In some embodiments, features are added to the carrying case to both ensure that the user does not neglect to leave the carrying case open when indoors and that the "footprint" is minimized. For example, a resilient element may be added that causes the carrying case to naturally open when it is unzipped. Alternatively, or in addition, the carrying cover can bend back on itself (i.e., be opened by 360 degrees), and if desired, a hook and loop (e.g., Velcro) fastener may be added to keep the case cover bent back on itself. In lieu of the Velcro, one of a myriad other apparatus, including snaps, clips, short zipper, etc. can be employed.

Additionally, it will be appreciated that actions may be taken by a user to fully recharge (fully melt) the PCMs within the carrying case before exposing the case and its enclosed objects to cold outdoor temperatures, in the event that the conditions implied by equations (15) and (16) are not met, due, for example, to 1) extended or frequent outdoor exposure, 2) insufficient time indoors, or 3) use of a PCM with a phase change temperature $T_{pc}$ greater than the temperature of the indoor environment in which the carrying bag is kept. By way of example only, such actions may include placement in a clothes dryer at a temperature safe for the carrying bag; placement adjacent to and above a baseboard heater, radiator, or other heating device within the home; and placement of a hot water bottle or other heating element into the interior of the carrying case. It will be appreciated that the use of such active measures to recharge the PCM enables both 1) superheating of the PCM to temperatures (e.g., 75° F. to 82° F.) substantially above its phase change temperature, and 2) the use of PCM with phase change temperatures (e.g., 73° F. to 75° F.) above the temperature of typical indoor environments. Superheating the PCM results in additional PCM energy storage as sensible heat, thereby increasing the time (i.e. beyond the time of phase change) over which the hard case and enclosed instrument are prevented from falling below the phase change temperature. The increase in phase change temperature will mean that the hard case and instrument within are stabilized at a higher temperature and will feel warmer to the touch when the instrument is removed from the carrying case and its hard case.

As previously mentioned with respect to FIG. 4, a low emissivity material 130 is optionally provided between PCM layer 110 and insulation layer 120 of the case cover. The low emissivity material 130 is intended to reduce heat flux through the case cover from radiation heat transfer, which represents another mode of heat loss to the environment. In one embodiment, the low emissivity material can be TEMPTROL, and it may be oriented with its shiny surface outward (i.e., toward the fiber insulation 120) per the manufacturer's recommendations.

In one embodiment, the PCM layer 110 is formed by encapsulating PCM in a spherical shell, and, therefore, the encapsulated PCM can be deployed in the carrying case, or any device for that matter, as if it were a solid material, although the PCM itself will transition between its solid and liquid phase during use. For example, PCM may come as beads or pellets with diameters of 4 to 5 mm from Microtek Laboratories in Dayton Ohio, or as powder with particles with diameters of 14 to 24 μm from either Microtek Laboratories or Encapsys LLC in Appleton, Wis. The PCM beads or pellets may be placed in measured amounts in the cutouts 111 of a flexible layer 113 having multiple cutouts 111, separated by intermediate members 112, as seen in FIG. 7a. After all the cutouts are filled, the flexible layer 113 is covered with a flexible, top and bottom sheet, each of which is sewn, bonded, melted or sonically welded to the intermediate members to form a flexible PCM layer 110 with multiple PCM-filled cutouts, thereby approximating an even distribution of PCM. Thus, in one embodiment, care is taken to ensure that the PCM remains distributed over the surface area of the case cover, rather than settling to the lowest point of the layer. In one embodiment, for ease of manufacture, multiple small fabric or plastic bags are pre-filled with a PCM beads or pellets and then placed side by side in each of the cutouts. The resulting multi-segment PCM layers are placed inside the insulation layer (with an optional low emissivity material therebetween) and are sewed in place, so that they cover the base, the top, both ends, and both large faces of the case cover. In another embodiment, as seen in FIG. 7b, the PCM layer 110' comprises PCM material encapsulated in a segmented bilaminate package such as a layer of MATVESL PURETEMP as previously described, resulting in regularly-spaced trapped volumes or cells 111' of PCM. The bilaminate material is optionally transparent to afford visual inspection of the trapped volumes or cells 111' of PCM. The flexural sections 112' between the trapped volumes or cells 111' are thin, thereby providing flexibility of the PCM layer 110' which may optionally be enclosed between a top and bottom fabric sheet for additional protection against a breach of the PCM containment and/or for enhanced appearance. According to one aspect, the segmentation of the inner PCM layer maintains the intended distribution of phase change material (PCM) over the area of the layer despite the tendency to settle. In another aspect, segmentation provides suitable flexibility of the layer 110' regardless of whether the PCM is in its liquid or solid phase. According to yet another aspect, segmentation minimizes the quantity of escaped PCM in the event of a breach of the PCM containment.

Figure 7D:
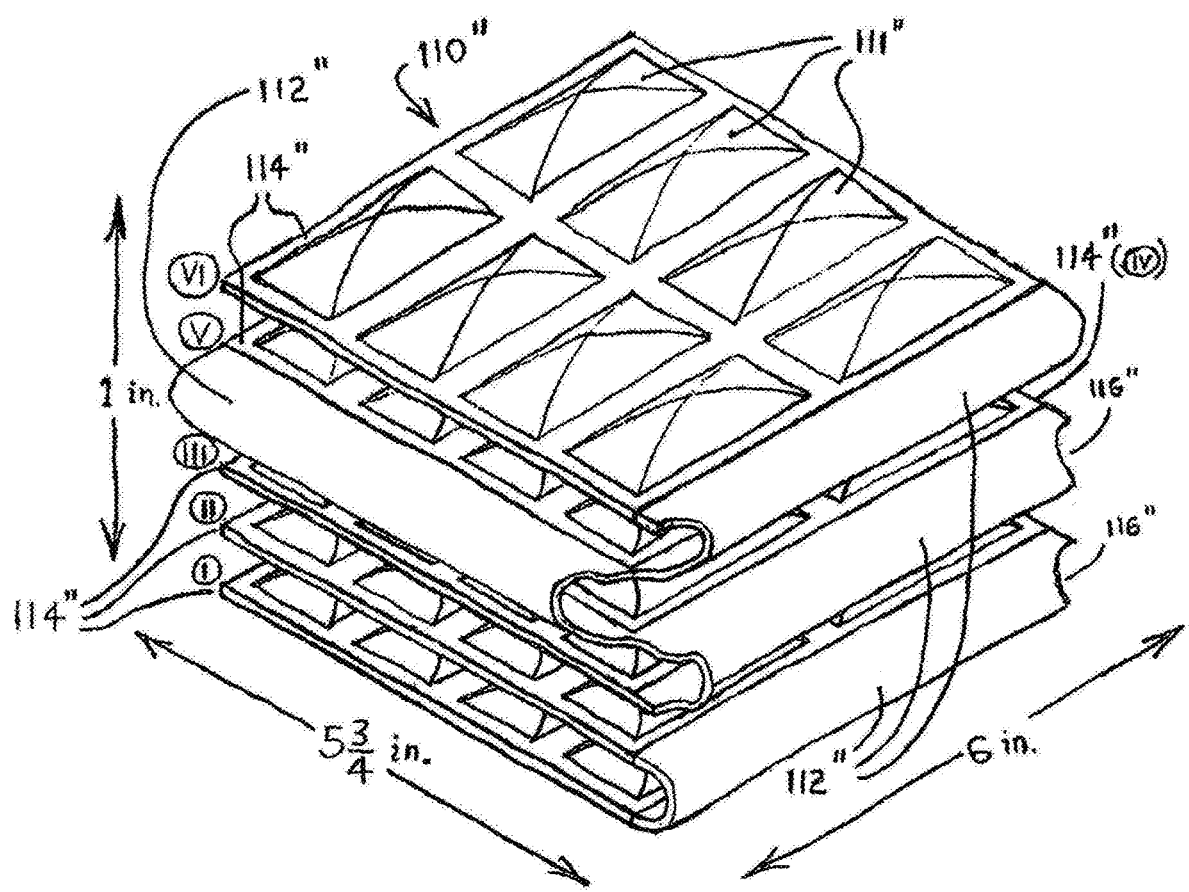

Turning to FIGS. 7c and 7d, another embodiment of a segmented PCM layer 110" is shown. Segmented PCM layer 110" is foldable into a stack at least three tiers or strata tall with at least one fold being orthogonal to another fold. Such an arrangement enables full conformance with the U.S. Transportation Security Administration (TSA) requirements for aircraft carry-on of liquids. Per TSA's 3-1-1 liquids rule, "You are allowed to bring a quart-sized bag of liquids, aerosols, gels, creams and pastes in your carry-on bag and through the checkpoint. These are limited to travel-sized containers that are 3.4 ounces (100 milliliters) or less per item." Accordingly, each cell 111" within 2D-foldable PCM layer 110" is sized to have a volume of 3.4 oz. (100 mL) or less. Further, the complete set of PCM layers (each comprising multiple cells) present in a carry-on carrying case is readily removable from the carrying case and fits within a quart-sized Ziploc® (a trademark of S.C. Johnson of Racine, Wis.) bag (or equivalent). More particularly, each PCM layer 110" folds into a size and shape that, when stacked with the other folded PCM layers of the carrying case, can be placed in a single quart bag. Since the duration of temperature stabilization may be proportional to the quantity of PCM, according to one aspect, the PCM layers are designed to fit in the quart size bag with a packing factor (i.e., PCM volume/quart bag volume) as close to unity as practically possible. The PCM layer 110" of FIG. 7c, for example, comprises 48 cells (8 rows×6 cells/row), each containing 5.8 mL of PCM, and covers a 12-inch by 18-inch area (i.e., 0.14 m$^2$), sufficient to span the entire face of a typical carrying case. As seen in FIG. 7d, the PCM layer 110" requires orthogonal folds to form a rectilinear stack with six tiers or strata 114" (tiers I-VI—also numbered in FIG. 7c) and an overall envelope dimension of 6-inches× 5¾-inches×1-inch, by folding first along line A-A of FIG. 7c, folding second along line B-B, and folding third along line C-C, where the third fold is in the opposite direction from the second fold, and where the second and third folds are orthogonal to the first fold. Keyhole-shaped cutouts 115" in the 2D-foldable PCM layer 110" are disposed as shown in FIG. 7c so that no flexural section 112" or portion thereof, when folded, is required to reach across the adjacent tier or stratum 114" to a more distant tier or stratum 114" in FIG. 7d. The circular portion 116" of the cutout prevents stress concentration at the root of the cutout, thereby preventing tearing of the flexural sections 112". Without cutouts 115", the length (L) of flexural sections 112" could be increased, in order to permit folding of the PCM layer such that adjacent tiers 114" are able to lie flat and parallel against one another when folded, although this would reduce the amount of PCM contained in PCM layer. According to one aspect, a single sealed quart bag (i.e., Ziploc® All-Purpose Storage Bags, 7 in.×7¹¹⁄₁₆ in. in the flat) can accommodate two folded PCM layers 110" of this size stacked one on top of the other, sufficient for both the front and back walls of some carrying case configurations (e.g., the pouch shown in FIGS. 12, 12a and 12e and described hereinafter).

Figure 7E:
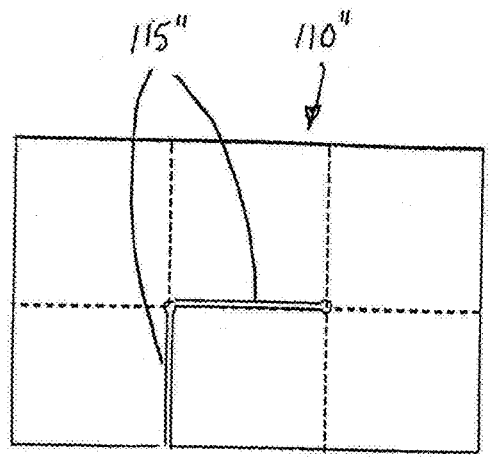
FIGS. 7e and 7f are schematic views of other embodiments of foldable, stackable segmented flexible PCM layers.
Figure 7F:
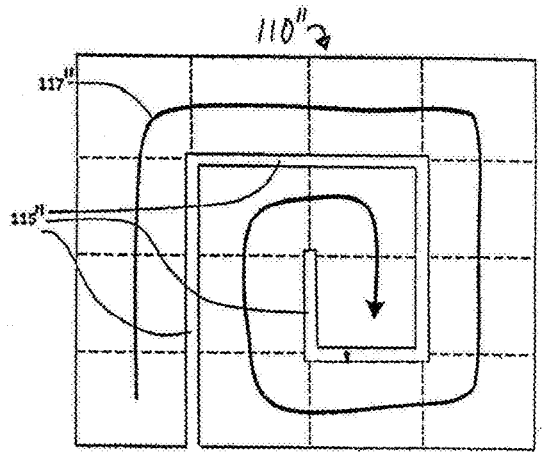
Figure 7G:
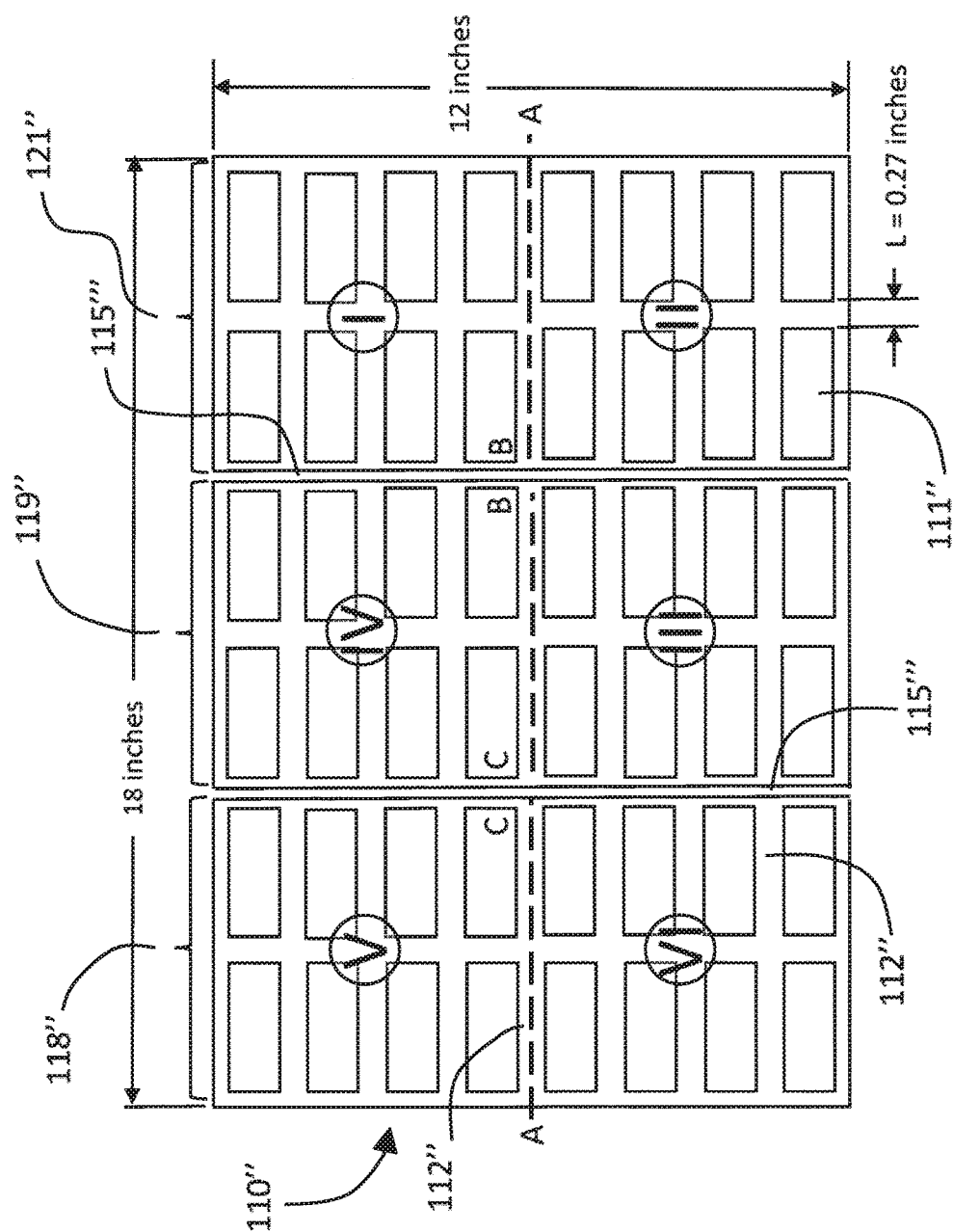
FIG. 7g is a top view schematic of yet another embodiment of a foldable, stackable segmented flexible PCM layer comprising three PCM panels.

According to another embodiment seen in FIG. 7g, cutouts 115'" are extended all the way across PCM layer 110" resulting in a segmented PCM layer 110" comprising three identical PCM panels 118", 119" and 121". As shown, left, center, and right PCM panels can be folded along lines A-C, C-B, and B-A, respectively, and stacked, thereby fitting in a volume equivalent to FIG. 7d. According to one aspect, a single sealed quart bag (e.g., Ziploc® (a trademark of S.C. Johnson of Wisconsin) All-Purpose Storage Bags 7 in.×7¹¹⁄₁₆ in. in the flat) can accommodate two folded PCM layers 110" (formed by either embodiment) of this size stacked one on top of the other, sufficient for both the front and back walls of some carrying case configurations (e.g., the pouch shown in FIGS. 12, 12a, and 12e and described hereinafter).

As seen in FIGS. 7b, 7c, 7d, and 7g, the flexural sections 112" between individual cells 111" are of sufficient width (L) to enable adjacent cells of thickness T to lie flat on top of (and parallel with) one another when the PCM layer is folded over. As shown in FIG. 7d, L≥T, and in one embodiment L≥(π/2)×T, so that the flexural section 112" is able to form a full semi-circle when folded over to permit adjacent cells 111" and, hence, entire strata 114" to lie flat on one another (it being noted that in FIG. 7d that four flexural connections 112" are shown and a fifth located between tiers II and III is hidden). For the above example dimensions, the thickness of a single cell (T) containing 5.8 mL of PCM is 0.17 inches and, hence, length (L) of flexible layer is 0.27 inches by the above expression. It is understood that the above choices for the number of 2D-foldable PCM layers, the overall dimensions of each PCM layer, the number of cells, the cell size, the tier dimensions and the number of folds are intended to be exemplary, and that the choices could be different for a change in TSA requirements (e.g., quart size bag requirement), or for the requirements of a different agency, or for a carrying case of a different size, shape, or number of walls. For that matter, even a PCM layer of the same size and shape as that of FIGS. 7c and 7g (i.e., 12-in.×18-in.) could instead comprise 6 rows×6 cells/row=36 cells, with each cell instead containing 7.7 mL of PCM. Further, it is understood that there are other placements of cutouts 115" in 2D-foldable PCM layer 110" may be chosen that will permit the above-described folding in two orthogonal directions (i.e., into a stack) as in FIG. 7e.

FIG. 7f illustrates the general principle for identifying feasible placements for cutouts in a 2D-foldable PCM layer 110" with 16 tiers or strata and a different shape. A path 117" is drawn that reaches all tiers without crossing any boundary between adjacent tiers more than once, and then cutouts 115" are made at all boundaries at which there is no path crossing.

In one embodiment, a PCM-based carrying case is used to keep payloads from getting too hot (rather than too cold) during transport or exposure to high temperatures. In this embodiment, the PCM material is chosen with a phase change temperature that is above (rather than below) the accepted safe temperature of the payload; e.g., between 80° F. or 85° F. and 100° F. or 110° F.

In some embodiments, a carrying case is provided that protects against both hot and cold temperatures. In other words, the carrying case maintains an interior temperature within a safe temperature range, when exposed to either a hot or a cold environment. This is accomplished by the approach described above by including both some PCM with a $T_{pc}$ above the desired temperature and some PCM with a $T_{pc}$ below the desired temperature. For example, in FIG. 7a a portion of the PCM beads or pellets in each cutout 111 of flexible layer 113 may have a PCM with $T_{pc}$ above the desired temperature by a chosen amount, whereas the remainder in same cutout may have a $T_{pc}$ below the desired temperature by the same amount. Alternatively, in FIG. 7b a fraction of the trapped volumes or cells 111' are filled with PCM with $T_{pc}$ above desired temperature, and the remainder of cells are filled with PCM with $T_{pc}$ below desired temperature.

Thus, in one embodiment, an array or set of PCMs are integrated into a container, carrying bag, or case, where the PCMs have varied phase change temperatures spanning a range of temperatures. For example, consider 390 g of encapsulated paraffin PCM divided evenly into ten groups— each with a different phase change temperature, as shown in Table 2.

TABLE 2

Example of even distribution of phase change temperatures

| $T_{pc}$ (° F.) | m (g) |
|---|---|
| 78 | 39 |
| 76 | 39 |
| 74 | 39 |
| 72 | 39 |
| 70 | 39 |
| 68 | 39 |
| 66 | 39 |
| 64 | 39 |
| 62 | 39 |
| 60 | 39 |

If all 10 groups of paraffin undergo a phase change by cooling or warming the material through the entire range of phase change temperatures, then 150 J/g×390 g=58,000 J of heat will be released or absorbed, depending on whether the paraffin is melting or freezing. This is equivalent to 390 g of a material with a specific heat given by $$\text{Specific Heat} = \frac{58000 \text{ J}}{390 \text{ g} \times (78° \text{ F.} - 60° \text{ F.}) \times \frac{5}{9} K/° \text{ F.}} = 15 \text{ J/g } K. \quad (17)$$

This value exceeds the specific heat of liquid water (4.2 J/g-K), liquid ammonia (4.7 J/g-K), and solid lithium (4.4 J/g-K) by considerable margins, which are substances noteworthy for their high specific heats.

The generalization of Eqn. (17) is $$\text{Effective specific heat} = \frac{\sum_{i=1}^{n}(m_{pcm})_i \times (h_{fusion})_i}{(m_{pcm})_{tot}\Delta T}, \quad (18)$$

where n is the total number of PCMs, $(m_{pcm})_i$ is the mass of the i'th PCM, $(h_{fusion})_i$ is the specific heat of fusion of the i'th PCM, $(m_{pcm})_{tot}$ is the total mass of the PCMs, and $\Delta T$ is the temperature range spanned by the set of phase change temperatures of the constituent materials. If the masses of each of the component PCMs are all equal and the specific heat of fusions of the component PCMs are equal ($=h_{fusion}$), then Eqn. (18) simplifies to $$\text{Effective specific heat} = \frac{h_{fusion}}{\Delta T}. \quad (19)$$

Figure 8:
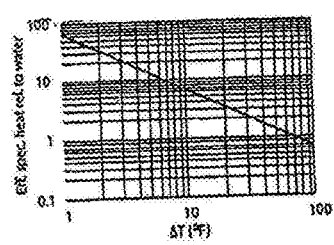
FIG. 8 is a plot showing the factor by which the effective specific heat of encapsulated paraffin with disparate phase change temperatures spanning a range of temperatures exceeds the specific heat of water.

In other words, a high effective specific heat can be achieved with an array of PCMs whose phase change temperatures are distributed over a selected temperature range. FIG. 8 indicates the factor by which the effective specific heat of encapsulated paraffin (with $h_{fusion}$=150 J/g) exceeds the specific heat of liquid water (=4.2 J/g-K), as a function of the temperature spanned ($\Delta T$) by the phase change temperatures. For example, if the phase change temperatures of the groups of encapsulated PCM span is 10° F. (i.e., $\Delta T$=10° F.), then the effective specific heat will be more than six times greater than the specific heat of water.

The significance of this for the approach disclosed above is revealed by equation (5) and FIG. 2, which demonstrated that the temperature at the interior of the case cover without PCM descends in an exponential way toward the outdoor temperature ($T_0$) with a time constant of $C/\kappa_{ext}$, where C is the heat capacity of the enclosed hard case and instrument. Since C is the product of the specific heat and mass of the payload, then a PCM array with a distribution of phase change temperatures offers a mechanism for significantly slowing the temperature descent. Plastics and woods have values of specific heat in the vicinity of 2 J/g-K, about half the specific heat of liquid water. Thus, for the above-mentioned temperature span of $\Delta T=10°$ F., the effective specific heat of the encapsulated paraffin is about thirteen times that of the materials used in the hard case and instrument. Therefore, for this span of phase change temperatures, the necessary added mass to increase the time constant of the temperature descent by a given factor would be thirteen times less with PCM than with added hard case mass.

In one aspect, the carrying case is portable. For purposes herein, the meaning of "portable" is that its size and weight is suitable for carrying by a typical human who would be carrying the payload in which the carrying case is placed. In some embodiments, the weight of the carrying case is less than 10 kg. In some embodiments, the weight of the carrying case is less than 5 or less than 2 kg. Also, for purposes herein, the term "carrying case" means that the case is capable of carrying an object of some reasonable value (e.g., in excess of $100), and that the case extends completely around the object.

Figure 9:
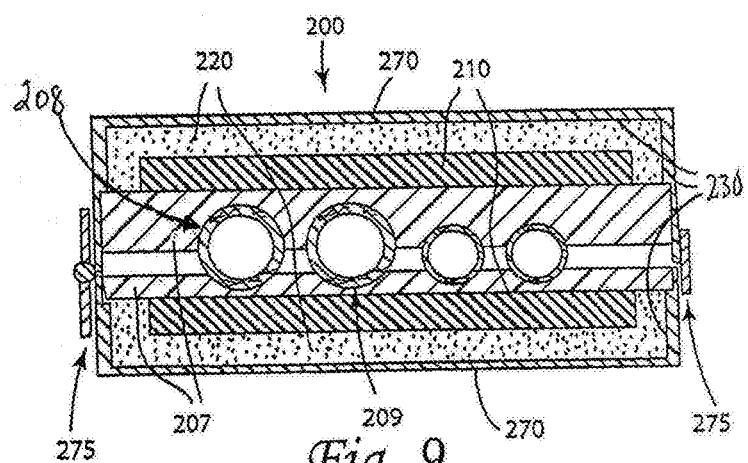
FIG. 9 is a cross-sectional diagram of another embodiment.

Turning to FIG. 9, another embodiment is seen. Carrying case 200 is shown for providing a temperature stabilized environment for an instrument 209 such as, by way of example and not by way of limitation, a clarinet (shown with multiple pieces). Case 200 includes an inner cushioning layer 207 of foam or the like defining circular cutouts 208 for an instrument, a PCM layer 210, an insulation layer 220, and an exterior hard shell 270. The hard shell 270 may have one or more latches and hinges 275 or the like, and is generally provided with a handle (not shown). If desired, the hard shell 270 may be covered by a fabric (not shown). Also, if desired, a low emissivity layer 230 may be provided between the PCM layer 220 and the hard shell 270. The insulation 220 may be an aerogel or Styrofoam, since flexibility is not required for this embodiment.

Another embodiment is seen in FIGS. 10a and 10b where a carrying case 300 defining an enclosure 301 is shown which is similar to the carry bag or case cover 100 of FIGS. 3a-3d and 4, except that the PCM layer is formed as inserts that are removable from the case. More particularly, case cover 300 utilizes two removable thermal inserts 310a, 310b that enclose PCM for absorbing and releasing energy, and an outer insulation layer 320. The thermal inserts 310a, 310b (which are optionally covered by fabric coverings 312a, 312b) are coupled to the insulation layer 320 by hook and loop fasteners (Velcro) 325. If desired, a low emissivity layer 330, comprising a thin fabric covering 305 and a low emissivity sheet such as Temptrol, may be located between the PCM inserts 310a, 310b and the insulation layer 320, and the fasteners 325 may be affixed (e.g., sewed) to the PCM inserts 310a, 310b and the low emissivity layer 330. Also, if desired, a wear-resistant and/or water-resistant and/or water vapor impermeable fabric layer 340 may be provided over (outside) the outer insulation layer 320. As seen in FIGS. 10a and 10b, the carrying case 300 may be provided with a zipper or other closure means 350, and a handle 360. The handle 360 may be a split handle with one loop attached to each portion of the cover 300a, 300b and may be made from webbing. In addition, the carrying case 300 may be provided with an exterior pocket 390 with a zipper or other closure means 392 for carrying sheet music or personal items, or the like. The carrying case 300 is dimensioned to fit over a relatively hard case, which by way of example only, may be a musical instrument case that includes a handle. The carrying case 300 may optionally, as space allows, accommodate additional items such as a pouch for accessories or reeds or reed knives, or the like.

In one embodiment, each thermal insert is provided with a fabric or plastic loop 365 which enables removal of the thermal insert from the inside of the carrying case 300 (as seen in FIG. 10b where one insert is removed). Removal of the thermal insert in an indoor environment increases its exposure to the surrounding warm air and enables the insert(s) to more quickly change phase for recharging purposes.

As seen in FIG. 10b, each insert 310a, 310b may also be provided with a temperature display 370. The temperature display may include a series of liquid crystal temperature indicators (LCTIs) such as RLC Reversible Temperature Indicating Labels (Omega Engineering of Norwalk Conn.) which present a black color except at specific temperatures where they brighten and present different colors. In one embodiment, a first display 370a includes LCTIs that show a short range or fine resolution such as 62° F. to 70° F. in increments of two degrees Fahrenheit, and a second display 370b includes LCTIs that show a long range or coarse resolution such as 32° F. to 86° F. in increments of nine degrees Fahrenheit. The temperature range of the first display is centered about the PCM phase change temperature, providing a visual measure of PCM state of charge as phase change is taking place. The longer range of the second display, on the other hand, has utility when PCM is not in the midst of a phase change by indicating how far and in what direction PCM temperature is from phase change temperature. One side (e.g., the "back side") of the display 370 is in direct contact with and affixed onto the PCM insert. The other side of the display (e.g., the "front" or "display" side) is visible from the interior of the carrying bag 300 through a window formed by a cutout in each of the fabric coverings 312a and 312b covered by a thin piece of transparent vinyl. In this manner, upon opening the carrying bag 300, a user can easily see the temperature of the PCM, and, thereby, assess both the PCM state of charge (relative to full charge) and the approximate temperature of the enclosure 301 inside of the carrying case 300. Further, the temperature display 370 enables user to assess the state of charge of PCM before re-insertion in carrying bag after either exposure of PCM insert to indoor temperatures or application of other heating methods. Additionally, the window provides simultaneous direct visual and tactile access to the PCM in its segmented containment which may optionally be transparent, thereby providing the user further observation of the state of charge of the PCM.

Figure 11A:
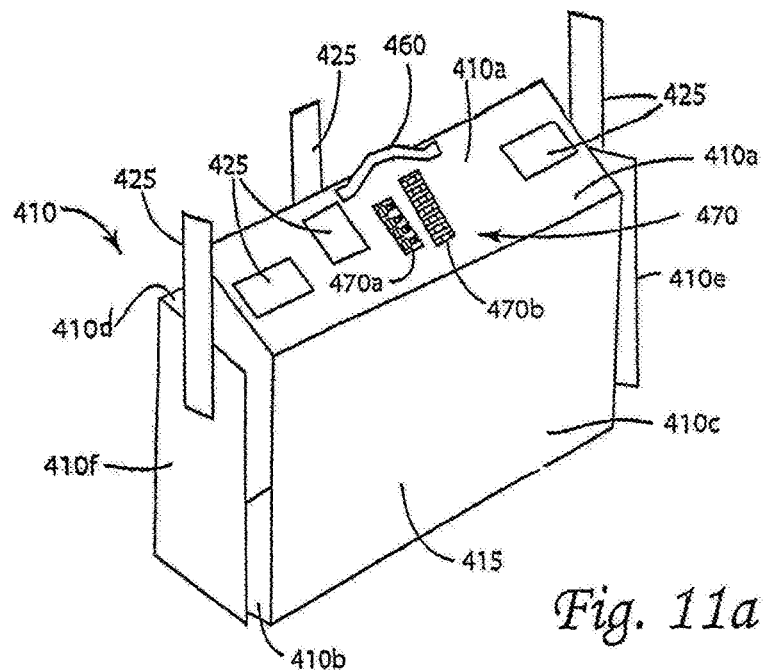
FIGS. 11a and 11b are respectively a diagram of a PCM thermal insert in a folded configuration and in an open configuration in another embodiment.
Figure 11B:
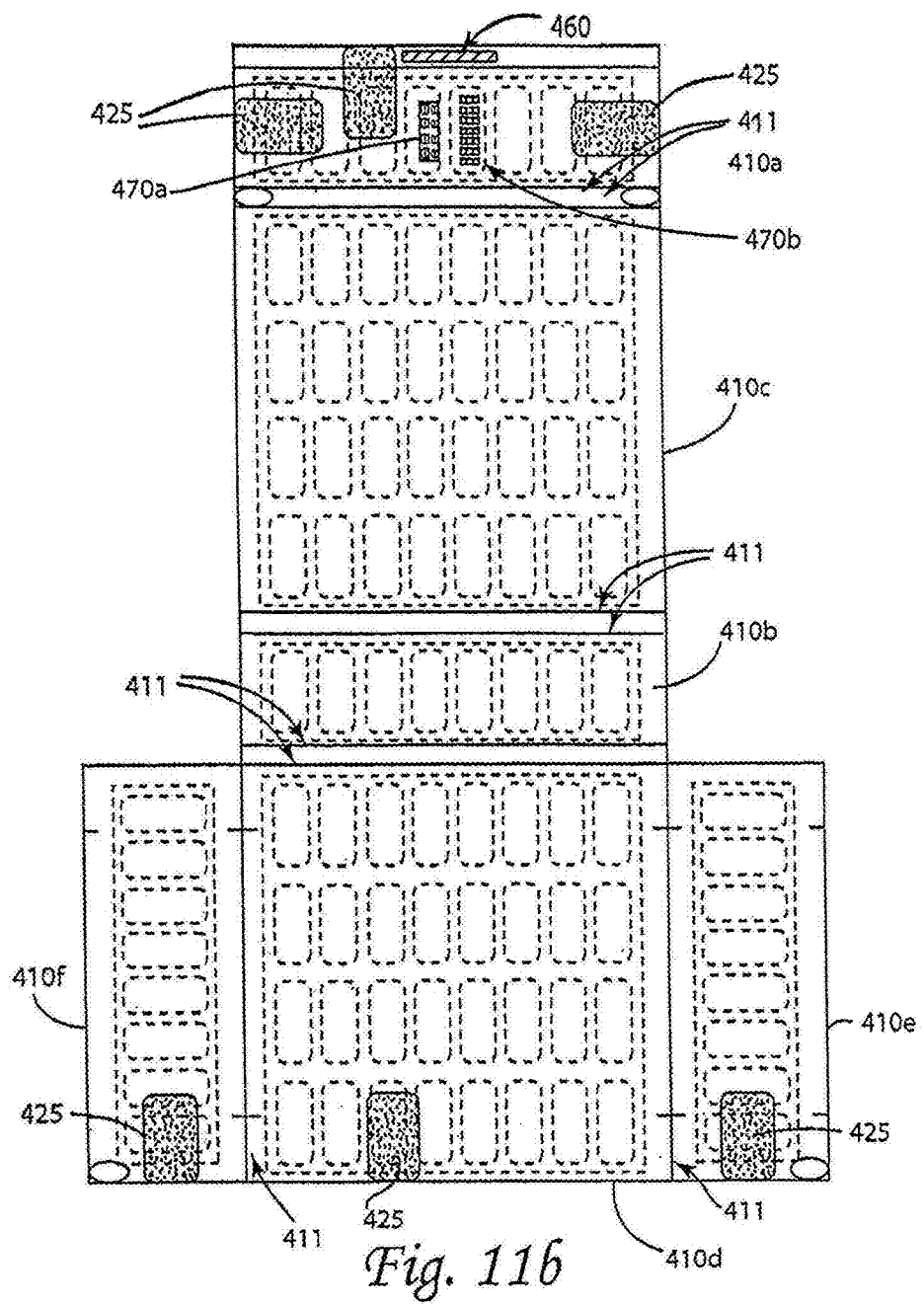

Turning now to FIGS. 11a and 11b, another embodiment is seen comprising a foldable, multi-panel PCM thermal unit 410 that, optionally, may be inserted into a carrying bag (not shown) which may include insulation. As seen in FIG. 11b, the foldable PCM unit 410 includes six multi-cell sections or panels that may be defined by seams 411. The sections of the PCM unit 410, when folded (as seen in FIG. 11a), constitute a top 410a, a bottom 410b and four sides 410c-410f of an enclosure. One or both sides of each of the sections may be covered with fabric 415 which may act as insulation and/or with insulation (not shown). An instrument case (not shown) may be placed in the enclosure. Hook and loop fasteners 425 may be provided and may extend from three of the sides (e.g., 410d, 410e, 410f) of the unit to the top side (410a) for securing the enclosure sides 410 in place. The top section 410a may also be provided with a handle 460 so that the unit may be lifted easily in its folded configuration and may be hung in its unfolded configuration. The unit 410 may also be provided with a temperature display 470 that in one embodiment includes one LCTI 470a showing a short range or fine resolution such as 62° F. to 70° F. and a second LCTI 470b showing a long range or coarse resolution such as 32° F. to 86° F. In one embodiment, the temperature display 470 is provided on the top panel 410a of the unit 410. The back side of the temperature display 470 is in contact with the PCMs and the front side of the display 470 is visible to the environment. In one embodiment, the back side of the temperature display 470 is not insulated, whereas the front side of the display is provided with a see-through insulation (e.g., clear vinyl and air layers) to enable direct visual access to the displayed temperature reading and simultaneous direct visual and tactile access to the PCM to which the display 470 is affixed.

Figure 12:
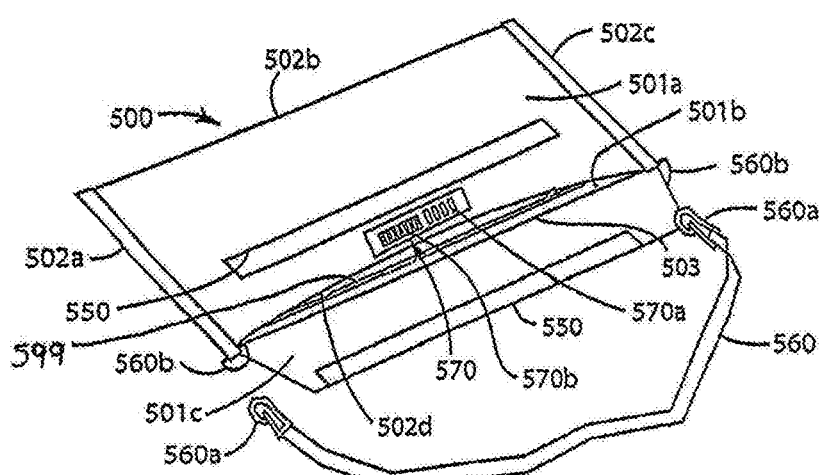
FIG. 12 is a perspective view diagram of another embodiment of a carrying case showing a pouch with three closed edges.

FIG. 12 is a perspective view diagram of another embodiment of a carrying case pouch 500 with a front panel 501a, a back panel 501b, a flap 501c, and with the front and back panels meeting at three closed edges 502a, 502b, 502c, and the front panel 501a presenting an opening edge 502d. The three closed edges may be closed by sewing, gluing, or otherwise attaching the panels to each other. In one embodiment, edges 502a and 502c are provided with zippers (not shown) for closing the edges, thereby permitting the pouch to be opened at one or both of those edges. The back panel 501b and flap 501c are divided by a seam 503. Both the front and back panels 501a, 501b comprise a layer of PCM and an insulation layer. Flap 501c comprises an insulation layer and optionally a layer of PCM. The PCM layer may be a multi-segmented flexible layer such as a layer of MATVESL PURETEMP as previously described. The insulation layer may be made of a tear resistant, water resistant fabric such as SUR LAST (a trademark of Glen Raven, Inc. of Glen Raven, N.C.) or CORDURA (a trademark of Invista of Wichita, Kans.) and/or it may be made from a fiber insulation such as THINSULATE. Where both a fiber insulation layer and fabric layer are utilized, the fiber insulation layer will typically be utilized in between the PCM layer and the fabric layer. If desired, a low emissivity sheet of material may be located between the PCM layer and the insulation layer. Also, if desired, the PCM layer (and where present, the fiber insulation layer and/or the low emissivity layer) may be enclosed in the fabric layer such that the inside of the pouch presents a fabric face. As seen in FIG. 12, the pouch 500 may be provided with a hooks and loops type (Velcro) fastener or other closure means 550 (preferably provided on the edge of the flap 501c and on the front panel 501a), and a carrying implement such as a handle and/or (shoulder) strap 560 with clips 560a arranged to clip onto rings 560b. Additionally and optionally, a waterproof zipper or ZIPLOC (a trademark of S.C. Johnson)-type seal 599 may be installed at edge 502d and seam 503 to provide an additional barrier to the passage of water vapor from the pouch interior to the environment (or vice versa), beyond that provided by flap 501c alone. Further, a small fabric pocket (not shown) may optionally be located on the interior fabric face to hold a humidity-controlling packet or element for the purposes of providing additional humidity control within the carrying case pouch 500. The pouch 500 is dimensioned to snugly receive a relatively hard case, e.g., of a musical instrument, and to have the flap 501c fold over the top portion of the front panel 501a and fasten thereto.

The pouch 500 may also be provided with a temperature display 570 that in one embodiment includes an LCTI 570a showing a short range or fine resolution such as 62° F. to 70° F. and a second LCTI 570b showing a long range or coarse resolution such as 32° F. to 86° F. The back side of the temperature display 570 is in contact with the PCMs, and the front side of the display is optionally provided with a see-through insulation (e.g., vinyl and air layers). In one embodiment, the temperature display 570 is provided on the front panel 501a of the pouch 500 between the fastener 550 and the opening edge 502d. In this manner, when the pouch 500 is closed with flap 501c extending over a portion of the front side 501a and fastened thereto, the display 570 is covered and insulated from the environment by the flap 501c. In any event, when the flap 501c is opened, the display 570 is visible and provides a user with an indication of the temperature of the PCM and simultaneous direct visual and tactile access to the PCM, and, hence, the state of charge of the PCM and approximate temperature inside the pouch.

Figures 12A, 12B:
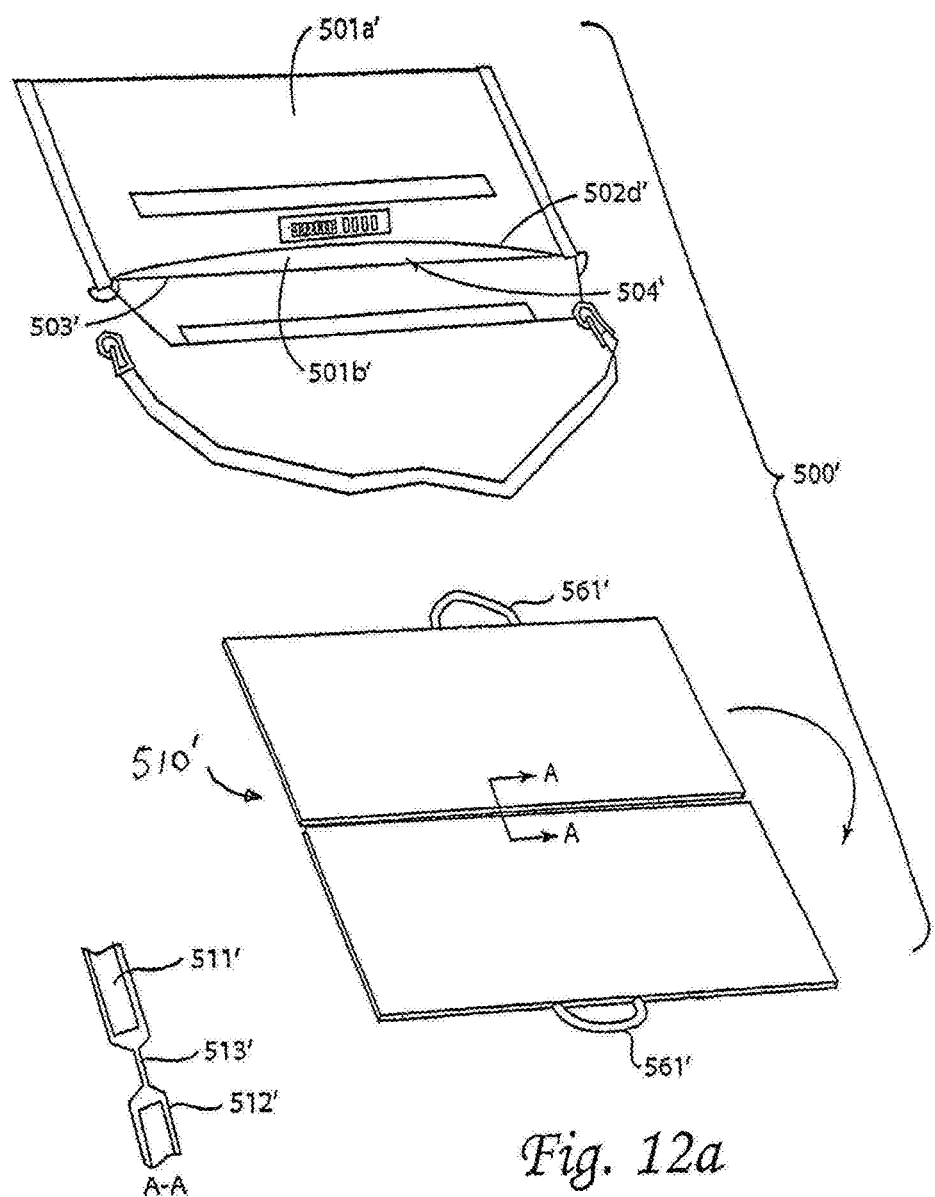
FIGS. 12a and 12b are respectively a diagram of a pouch with a removable PCM insert and a cross-section through location A-A of the insert.

An embodiment of a pouch 500' similar to pouch 500 is seen in FIG. 12a, with front and back panels 501a' and 501b', each comprised of a layer of insulation and low emissivity sheet enclosed in wear-resistant, water-resistant fabric, with an opening 504' defined between edge 502d' and seam 503' for receiving foldable PCM layer 510'. Foldable PCM layer 510', as seen in FIGS. 12a and 12b, is provided with PCM 511' encapsulated in a segmented flexible sheet or bilaminate package which is optionally covered on one or both sides by fabric 512'. The PCM layer 510' has a fabric fold area 513' with two seams for permitting the PCM layer to be folded on itself and inserted into the pouch 500'. The PCM layer 510' also includes loop handles 561' for expediting removal of the PCM layer from the pouch 500' and/or for hanging the PCM layer from a coat hanger or hook for rapid recharge.

Figure 12D:
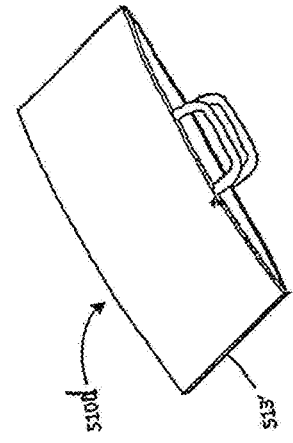
FIGS. 12c and 12d are respectively alternative embodiments for the foldable PCM layer.
Figure 12C:
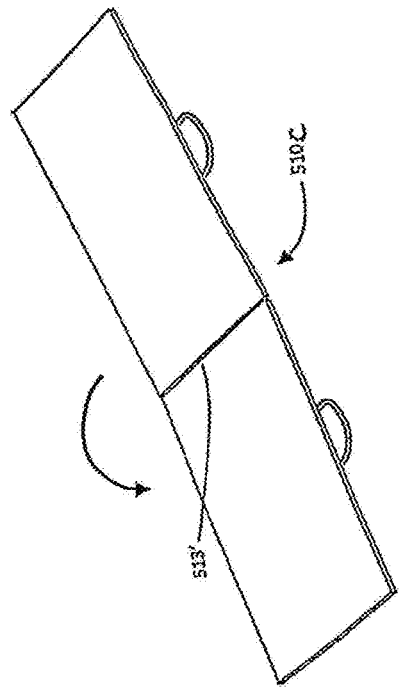

Alternative embodiments of a foldable PCM layer 510c and 510d are seen in FIGS. 12c and 12d, where the PCM layer is substantially as shown with respect to PCM layer 510' of FIG. 12a, except that the fold area 513' is located differently. In particular, in FIG. 12c, the fold area 513' is disposed along a side edge as opposed to bottom edge, while in FIG. 12d, a fold 513' is provided along each side edge. The arrangements of PCM layers 510c and 510d enable removal of the PCM layer from (or insertion into) the pouch without removal of the contents of the pouch.

In one aspect, interchangeable, insertable/removable PCM layers enable the user to readily achieve different temperature stabilization limits with a given pouch. For example, during the cooler months of the year the user may employ a PCM layer designed to arrest the temperature descent of the musical instrument at 63° F. (or other desired temperature), whereas during the summer, in which the instrument may be left for extended periods in a parked car, the user may swap in a PCM layer designed to arrest the temperature rise of the instrument at 90° F. (or other desired temperature). In another aspect, removal of the PCM layer from the pouch may also be useful if the carrying case pouch 500' is going to be carried through airport security. Removable PCM layers will enable the user 1) to remove the PCM layer 510' (or 510c or 510d) from the pouch and submit it to the airport security official upon request and 2) either to re-insert the PCM layer 510' (or 510c or 510d) in the pouch, or, if required, place the PCM layer in user's checked luggage rather than carry it on the aircraft. In all other respects, pouch 500' may be the same as pouch 500 of FIG. 12.

Figure 12E:
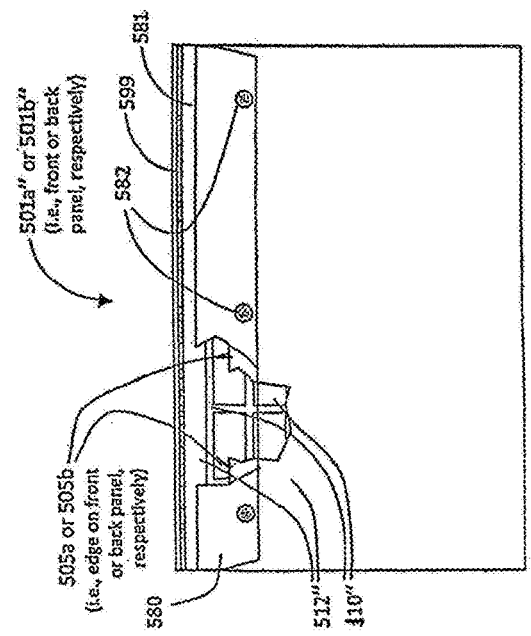
FIG. 12e is a broken-away schematic of another pouch embodiment.

In yet another embodiment of the pouch seen in FIG. 12e, the interior surfaces of both the front panel 501a and back panel 501b of the pouch 500 (of FIG. 12) comprise double fabric layers 512" which are open at edge 502d and seam 503 or, alternatively, along edges 505a and 505b (of FIG. 12e) respectively, thereby forming pockets. The pockets may be closed with zippers, hooks and loops (Velcro), snaps, or other fastening means. FIG. 12e, for example, shows flap 580 being folded down at fold line 581 and closed with multiple snaps 582. A foldable PCM layer 110", comprising PCM encapsulated in a segmented bilaminate package (as shown in FIG. 7b, 7c or 7d) may be provided without fabric covering for insertion between the double layers of each panel. In one aspect, pockets with insertable/foldable PCM layers without fabric covering, permit direct verification by TSA or other airport security personnel of compliance of the 2D-foldable PCM layers 110" with the previously stated TSA 3-1-1 liquids rule for carry-on bags. Each of two 2D-foldable PCM layer is removed, folded and placed in a quart bag for inspection. The number of 2D-foldable PCM layers 110" to be removed from the pouch need only be two, thereby facilitating rapid removal at airport security and placement in a quart bag.

Figure 12F:
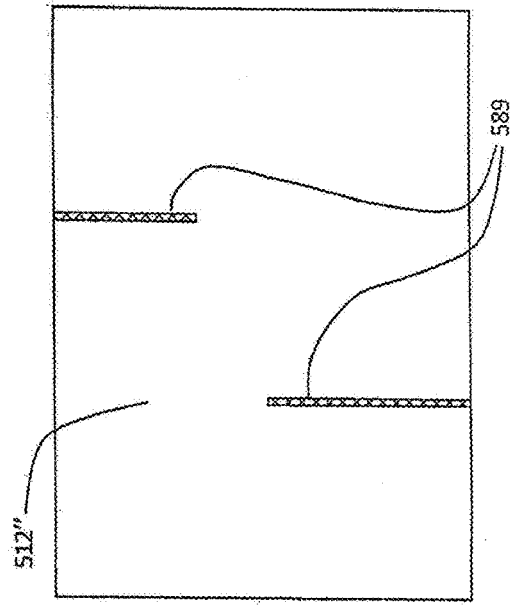
FIG. 12f is a schematic of a panel of a pouch having seam stops for helping hold a PCM layer.

In one embodiment seen in FIG. 12f, each pocket of the pouch may be interrupted by seams 589 that pass through double fabric layer 512" and align with cutouts 115" (see FIG. 7c) in the 2D-foldable PCM layer 110" (when the PCM layer is inserted in the pocket), thereby 1) preventing excess space in the pocket from opening up due to the individual layers of the double fabric layer 512" moving apart from one another and 2) securing the PCM layer within the pocket such that PCM layer lies flat rather than folds, furls or curls up within the space of the receiving pocket. Each seam may be the same length as corresponding cutout or, optionally, may be shorter than corresponding cutout to ease insertion and removal. Alternatively, the permanent seams may be replaced with joining methods that can be undone (not shown), such as hooks and loops (Velcro), one or more snaps, a ZIPLOC (a trademark of S.C. Johnson)-type fastener, or other method for joining the two fabric sheets of the double fabric layer at the cutout locations.

Figure 12G:
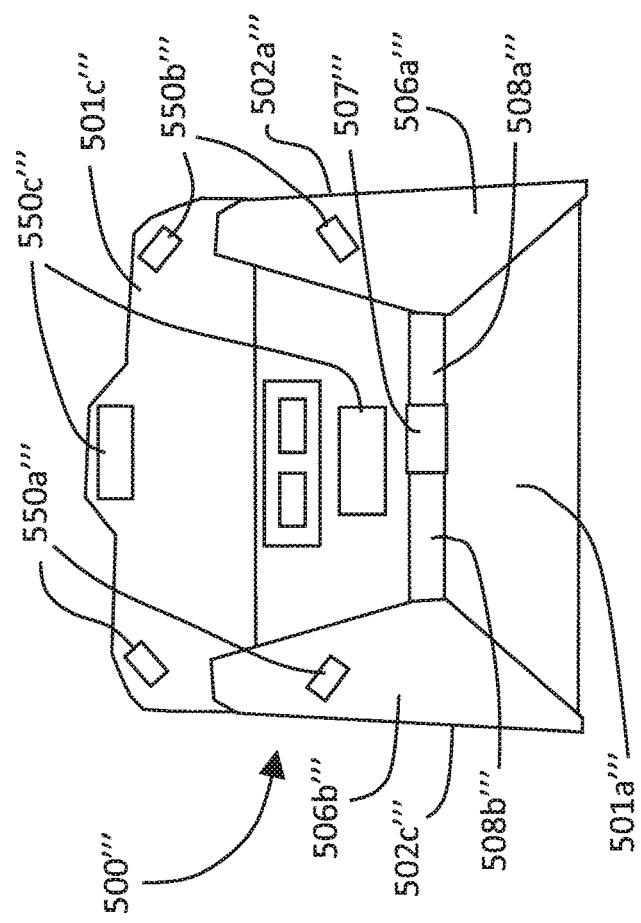
FIG. 12g is a schematic of an embodiment of a pouch having side flaps on right and left sides.
Figure 12H:
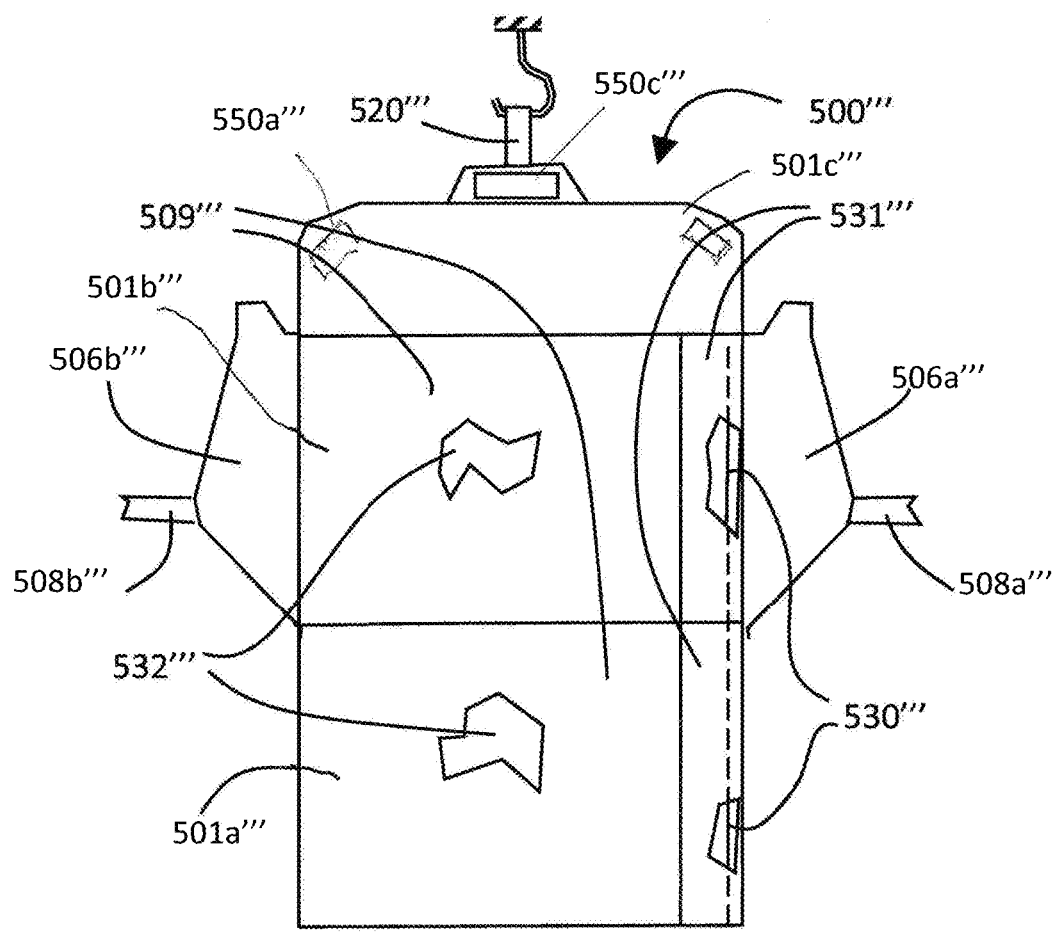
FIG. 12h is a schematic view of the open configuration of the pouch embodiment of FIG. 12g.

Another embodiment of a pouch 500''' for carrying a musical instrument case is seen in FIGS. 12g and 12h. Pouch 500''' includes a PCM containing front panel 501a''', a PCM containing back panel 501b''', side flaps 506a''' and 506b''' that are coupled to the back panel at edges 502a''' and 502c''', a flap closure 508a''', 508b''', 507''', and a pouch closure panel 501c'''. When the front panel 501a''' is folded up over back panel 501b''', the side flaps fold at edges 502a''' and 502c''' and may be held tightly over the front panel due to tension in straps 508a''' and 508b''' when closed by buckle 507'''. An instrument may be inserted into the resulting pouch 500'''. Closure flap 501c''' is secured closed to the front panel by hook and loop strips 550a''', 550b''' and 550c'''. When buckle 507''' is released and the straps are freed, side flaps 506a''' and 506b''' can be folded outward, and front panel 501a''' can folded downward, thereby achieving the open configuration for the pouch of FIG. 12h. In its open configuration the pouch interior surface 509''' is fully exposed to the room temperature air (once the instrument case is removed), since there is no fiber or reflective (i.e., low emissivity) insulation between the PCM layer 110''' and the warm indoor air. Hence, the thermal conductance from PCM to the pouch interior surface 509''' is increased and is considerably greater than the thermal conductance from PCM to pouch exterior ($\kappa_{ext}$). Additionally, if pouch 500''' is hung vertically (FIG. 12h) from a loop 520''', natural convection heat transfer at the pouch interior surface is increased, further increasing thermal conductance from PCM to pouch interior ($\kappa_{int}$). Consistent with earlier discussion herein as well as Eqns. (11) and (12), the benefit is to shorten the time necessary for the PCM to melt (i.e., recharge) during indoor exposure, as well as to reduce the ratio of the time necessary to melt the PCM (i.e., recharge) to the time necessary to freeze the PCM (i.e., discharge) ($=t_{melt}/t_{freeze}$). The embodiment of FIGS. 12g and 12h has further benefit of allowing access to pocket openings 530''' (visible in two breakaways in FIG. 12h) to pockets 532''' formed by the space between fabric layer at pouch interior surface 509''' and low emissivity fabric layer behind. Pockets 532''' may contain PCM layers, and, further, access to pocket opening 530''' enables PCM layers to be readily installed or removed. Pocket openings 530''' may optionally be located under fabric covers 531''' to prevent installed PCM layers from inadvertently sliding out of pockets.

Figure 12I:
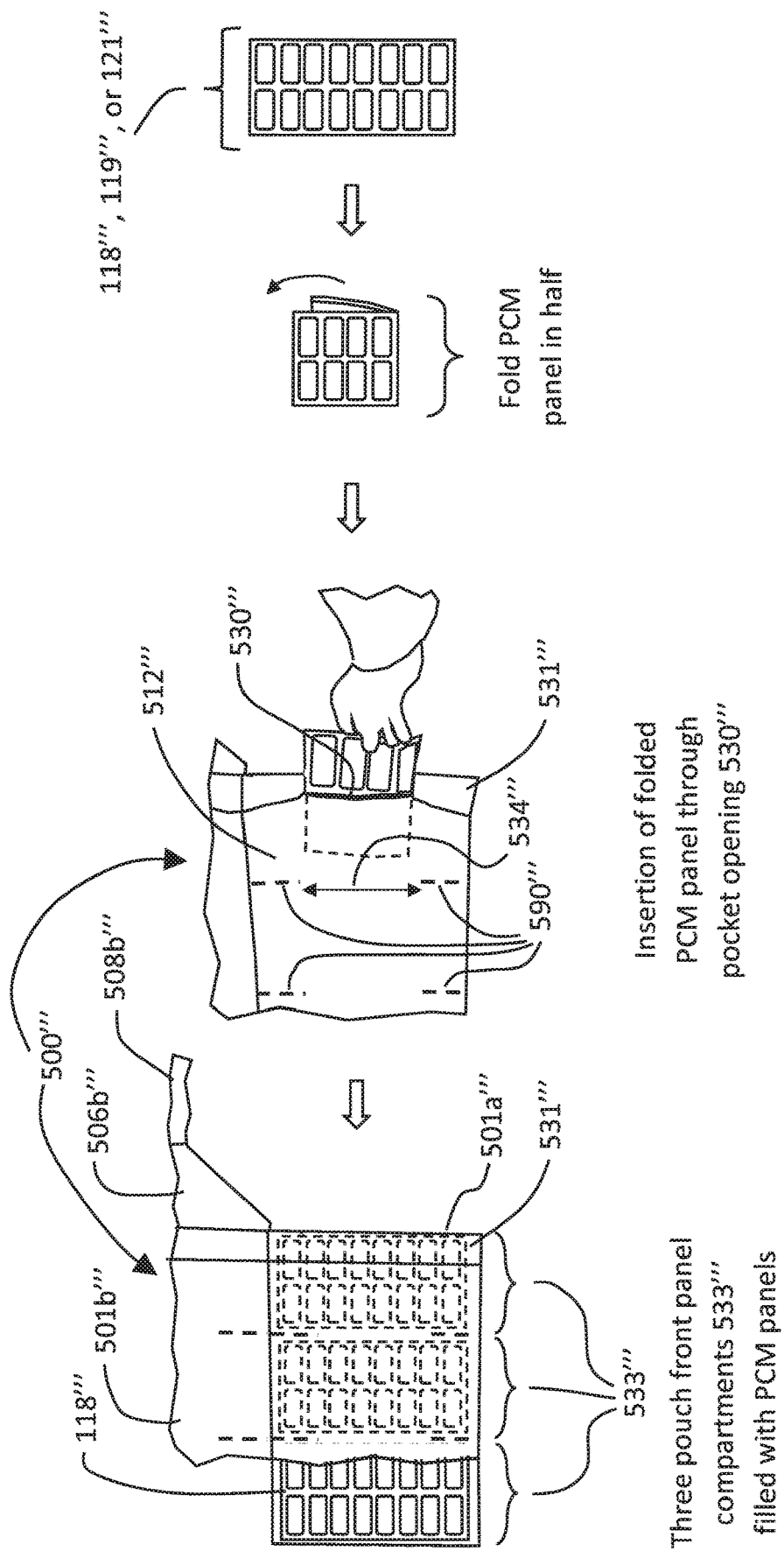
FIG. 12i is a four-panel illustration of insertion and removal of PCM panels from the pouch embodiment of FIGS. 12g and 12h.

As seen in FIG. 12i, starting from the right and moving left, each of three PCM panels 118''', 119''', 121''' (one shown) is folded in half, inserted one-at-a-time through pocket opening 530''' into pocket 532'''. Each pocket of the pouch is interrupted by seams 590''' that pass through double fabric layer comprising fabric layer at pouch interior surface 509''' and low emissivity fabric layer behind. Locations of seams 590''' divide each pocket 532''' into three compartments 533''' of identical shape and size. Seams are interrupted for a distance of sufficient length 534''' to allow passage of folded PCM panels 118''', 119''', 121''' from one compartment to another. Upon reaching destination compartment, PCM panel is unfolded and deployed. Removal of PCM panels (for TSA inspection, replacement, or recharge) is accomplished by reversing the order of actions described above for installation. Compartments 533''' separated by seams 590''' prevent excess space in the pocket from opening up due to the individual layers of the double fabric moving apart from one another, thereby keeping PCM panels from folding, furling, or slumping within the space of the pocket. Compartments also secure the PCM panels within the pocket such that each PCM panel remains properly oriented, rather than tipping to the left or right. Alternatively, the permanent seams may be replaced with joining methods that can be undone (not shown), such as hooks and loops (VELCRO®), one or more snaps, a ZIPLOC®-type fastener, or other method for joining the two fabric sheets of the double fabric layer at the cutout locations.

Figure 12J:
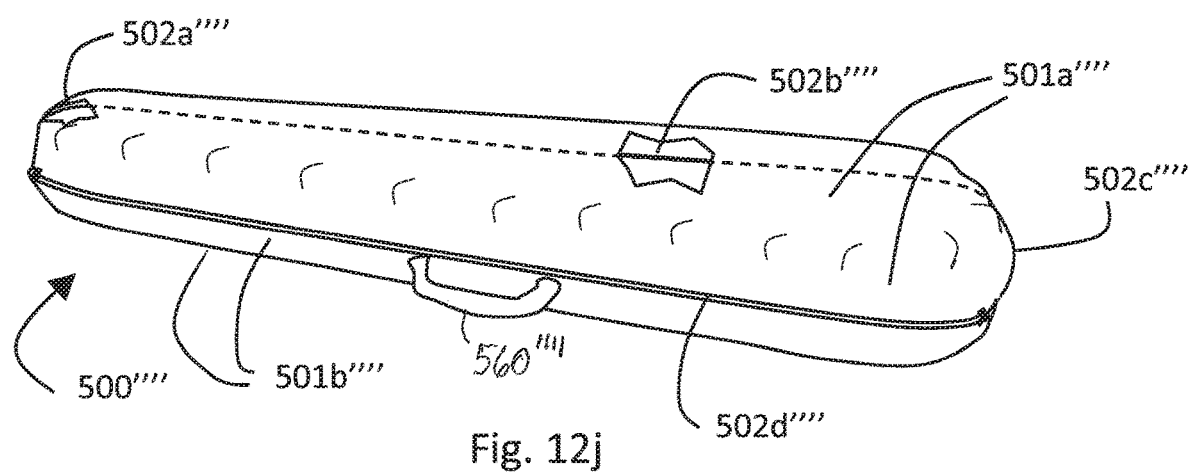
FIG. 12j is a schematic view of an pouch having an non-rectangular shape.

According to another aspect, the shape of a carrying case or pouch is not limited to having three or more straight closed edges and an opening edge. A carrying case or pouch may, for example, have front and back panels meeting at a periphery comprising 1) an open edge that serves as an opening into the pouch and 2) a continuous edge, consisting of one or more curved or straight closed edges that meet at their ends. Thus, by way of example, and turning to FIG. 12j, pouch 500'''' has two curved closed edges 502a'''' (visible through figure breakaway) and 502c'''', one straight closed edge 502b'''' (visible through figure breakaway), and one open edge 502d'''', enabling a pouch shape profile suited to compactly hold a stringed instrument such as a violin, viola, cello or guitar (depending on size), or hard case containing these instruments. The pouch shaped profile forms an enclosure with a curvilinear portion. In one embodiment, the three closed edges may be closed by sewing, gluing, or otherwise attaching the panels to each other. In another embodiment, a single panel of suitable shape may be used to start, and through the use of one or more seams or gluing, the single panel may be formed into top and bottom (or front and back)

panels, and if desired, one or more side panels. In FIG. 12j, the open edge 502d"" is provided with a zipper or other closure element (not shown), which may optionally be waterproof. Further, a small fabric pocket (not shown) may optionally be located on the interior fabric face to hold a humidity-controlling packet or element for the purposes of providing additional humidity control within the carrying case pouch 500"". The front panel 501a"" and back panel 501b"" are divided by a seam at aforementioned closed edges. Both the front and back panels comprise a layer of PCM and an insulation layer. The PCM layer may be a multi-segmented flexible layer such as a layer of MATVESL PURETEMP, as previously described. The insulation layer may be made of a tear resistant, water resistant fabric such as SUR LAST (a trademark of Glen Raven, Inc. of Glen Raven, N.C.) or CORDURA (a trademark of Invista of Wichita, Kans.) and/or it may be made from a fiber insulation such as THINSULATE. Where both a fiber insulation layer and fabric layer are utilized, the fiber insulation layer will typically be utilized in between the PCM layer and the fabric layer. If desired, a low emissivity sheet of material may be located between the PCM layer and the insulation layer. Also, if desired, the PCM layer (and where present, the fiber insulation layer and/or the low emissivity layer) may be enclosed in the fabric layer such that the inside of the pouch presents a fabric face. As seen in FIG. 12j, the pouch 500"" may be provided with a carrying implement such as a handle 560"" and/or shoulder strap (not shown) that is attached to one of the top and bottom panels. If the carrying case or pouch includes one or more side panels, the handle and/or shoulder strap may be connected to a side panel.

Turning now to FIGS. 13, 13a and 13b, a flexible carrying case wrap 600 is provided, comprising a PCM layer 610 located inside an external insulation layer 620 (as in FIG. 13b) with an optional low emissivity layer 630 therebetween, and with two attached end flaps 601 (as in FIGS. 13 and 13a). Also, if desired, a wear-resistant, water-resistant fabric layer 640, such as CORDURA (a trademark of Invista of Kansas) or Sur Last® (by Glen Raven of North Carolina) may be provided over (outside) the outer insulation layer 620. The fabric layer 640 may also be impermeable to water vapor. In a first position, the case wrap may be laid flat and is substantially rectangular in shape. In a second position, case wrap 600 is wrapped around a hard case 670 for an instrument and pulled until it overlaps itself and is snug around the hard case, whereupon straps 680 with hooks and loops (Velcro) 681 secure the wrap around the hard case and from unwrapping by engaging hooks and loops on the exposed surface of the wrap 600. Optionally, PCM layer 610 may not span the portion of the wrap 600 that overlaps itself, being instead confined to substantially all (at least 90%) of the wrap that directly surrounds and/or is in contact with the hard case 670. Also optionally, provisions may be made to enable removal of PCM layer from the wrap and folding and placement in a one quart bag in a manner substantially equivalent to manner depicted in earlier described embodiment of FIGS. 7b, 7c and 7d. End flaps 601 and/or the portion of the wrap without the PCM layer may be folded over at the locations of the ends of the PCM layer and are pulled tight and secured with additional hooks and loops 602 so that the case 670 is enveloped on all sides with the PCM layer. A handle 660 attached (e.g., sewn) to the outside of the external insulation layer 620 is provided and may be made of a fabric webbing or other material.

Figure 14:
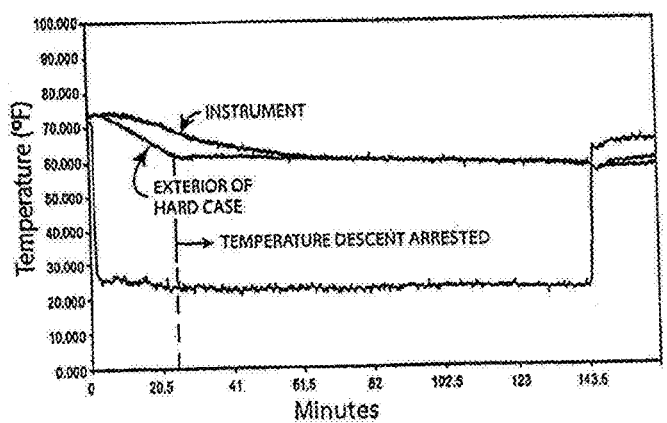
FIG. 14 is a measured temperature vs. time plot for the interior of the carrying case of FIG. 12.

FIG. 14 shows the measured temperatures versus time of the instrument and the hard case contained within a prototype of the carrying case pouch 500 of FIG. 12 (with parameter values shown in the right-hand column of Table 3 below) upon removal from an indoor environment of approximately 74° F. and during exposure to an outdoor temperature of 23° F. As seen in FIG. 14, the temperature descent of the hard case is arrested after approximately twenty-four minutes at about 63° F. by the phase change of the PCM. The values of various parameters for this prototype are shown in Table 3 in the right-hand column and are compared to the parameter values of the prototype of FIG. 4 shown in the middle column of Table 3 (values taken from Table 1). As seen in Table 3, the pouch prototype 500 had a PCM mass of 840 g (compared to the 390 g of the prototype of FIG. 4) and a lower thermal conductance to the external environment (due to a smaller outer surface area of 0.28 m$^2$ rather than 0.49 m$^2$). Use of the parameter values in the right-hand column of Table 3 in equation (10) yields a time of 272 minutes (=4 hours and 32 min.) for freezing of the PCM in the pouch prototype to be complete when exposed to an external temperature of 23° F. As suggested by FIG. 14, the prototype was brought indoors after exposure to 23° F. for a period of two hours and twenty-three minutes. FIG. 14 further suggests that if the prototype had been left outdoors beyond this time, arrest of the temperature descent would have continued, and, hence, complete freezing of the PCM had not yet occurred. This is to be expected, since exposure of the prototype to the outdoor temperature was stopped well short of the predicted time of freezing of four hours and thirty-two minutes.

TABLE 3

Values used in equation (10) to predict how long temperature descent is arrested (i.e., PCM freezing time) during test of two prototypes (see also FIGS. 5 and 14)

| | | |
|---|---|---|
| $T_0$ | 30° F. (−1.1° C.) | 23° F. (−5.0° C.) |
| $T_{pc}$ | 64° F. (18° C.) | Same |
| $h_{fusion}$ | 150 J/g (encapsulated paraffin) | 192 J/g (Matvesl PureTemp 18) |
| $m_{pcm}$ | 390 g | 840 g |
| $K_{ext}$ | 0.76 K/W (see Eqns. (7), (8) & (9)) | 0.43 K/W (see Eqns. (7), (8) & (9)) |

It should be appreciated that all of the carrying cases previously described are "portable", which shall be understood to mean that an average non-disabled human of average strength may place an object in the carrying case and transport the carrying case and object without assistance. In one embodiment, the carrying case weighs less than ten pounds. In one embodiment, the carrying case weighs less than seven pounds. In one embodiment, the carrying case weighs less than five pounds. In one embodiment, the carrying case weighs less than four pounds. In one embodiment, the carrying case weighs less than three pounds.

It should also be appreciated that all embodiments describing a removable PCM layer may utilize one or more stackable PCM layers such as described in the embodiments of FIGS. 7c-7g.

In one embodiment, a method of transporting a temperature-sensitive instrument, equipment, device or object (hereinafter broadly referred to as "object") includes placing the object (such as a musical instrument) in any of the previously described carrying cases (including wrap cases) having a plurality of layers, including an inner layer having a phase change material contained in a segmented layer and an outer insulation layer that may also serve as a shock absorber. In one embodiment, a low emissivity layer is located between the phase change material layer and the outer insulation layer, and in one embodiment, a wear-resistant and water-resistant fabric layer is provided over (outside) the outer insulation layer. The object is carried in its case surrounded by the carrying case from a first location (usually an indoor location) at a first temperature, where the PCM in the carrying case is in a first state (phase), into a location or environment (usually outdoor) at a second temperature, which causes the PCM in the carrying case to start changing state to a second state while stabilizing the temperature in the carrying case. Eventually, the carrying case with the object is brought to a second location or environment (usually indoor) having an ambient temperature near or at the first temperature (which for purposes shall be understood to be within 10° F.), where the carrying case is opened and the object and optionally its case are removed from the carrying case. The carrying case is then left at the second location to recharge such that the PCM changes state from the second state back to the first state.

It will be appreciated that where the carrying case is used to protect objects against the cold, the first state (phase) is generally liquid, and the second state (phase) is generally solid.

There have been described and illustrated herein several embodiments of a portable apparatus utilizing phase change materials to create a temperature stabilized environment and method of using the same. While particular embodiments have been described, it is not intended that the invention be limited thereto, as it is intended that the invention be as broad in scope as the art will allow and that the specification be read likewise. Thus, while particular embodiments of a carrying case for particular musical instruments have been described, it will be appreciated that the embodiments can apply to carrying cases for other musical instruments such as bassoons, violins, cellos, double basses, guitars, recorders, piccolos, saxophones, flutes or other instruments, as well as to provide a temperature stabilized environment for other sensitive and/or expensive objects. Also, while particular embodiments may have been described containing particular elements such as a temperature display, it will be appreciated all of the embodiments may contain such elements whether specifically stated or not. It will therefore be appreciated by those skilled in the art that yet other modifications could be made to the provided invention without deviating from its spirit and scope as claimed.

What is claimed is:

1. A portable carrying case, comprising:
    a first layer containing phase change material (PCM) with a phase change temperature between 50° F. and 95° F.;
    a second layer comprising an insulation layer and a low emissivity layer, said first layer and second layer arranged to form an enclosure defining at least one closable opening with said first layer inside said second layer; and
    a carrying implement,
wherein said portable carrying case comprises a front panel and a back panel that meet at at least one edge and define said opening to said enclosure, and said front panel and said back panel define respective openings for receiving said first layer containing PCM and for removal of said first layer containing PCM from between said insulation layer and said low emissivity layer, said first layer containing PCM extending substantially the entire length and width of said front panel and said back panel, side flaps extending from at least one of said front panel and said back panel and having mating fastening elements such that in one configuration said side flaps are folded over one of said front panel and said back panel and cause said front panel and back panel to form said enclosure, and a closure flap coupled to one of said front panel and said back panel and movable from a first position where said enclosure is open to a second position where said flap covers said opening, said front panel and said back panel each comprised of said first layer and second layer.

2. The portable carrying case according to claim 1, further comprising a temperature display is located in or on one of said front panel and back panel.

3. The portable carrying case according to claim 2, wherein said first layer includes a plurality of multi-segmented elements each foldable into at least a stack of two strata.

4. The portable carrying case according to claim 3, wherein said first layer when in a folded configuration fits into a one quart bag.

5. A portable carrying case, comprising:
    a first layer containing phase change material (PCM) having a phase change temperature between 50° F. and 95° F.;
    a second layer comprising insulation;
    a closure element; and
    a carrying implement, wherein
    said first layer and said second layer are arranged and sized to form a case or pouch sized to receive a string instrument at least as large as a violin, with at least a front panel and a back panel forming an enclosure with a curvilinear portion and an opening sized to receive the stringed instrument or a stringed instrument case for the stringed instrument, said opening closable by said closure element, and said carrying implement extending from said case or pouch, wherein said first layer containing PCM covering substantially the entire surface area of said case or pouch.

6. The portable carrying case according to claim 5, wherein said front panel and said back panel meet at a periphery, said periphery having a straight portion and at least one curved portion.

7. The portable carrying case according to claim 5, wherein said at least front panel and back panel further comprises at least one side panel, and said carrying implement is coupled to said at least one side panel.

* * * * *